United States Patent
Shin et al.

(10) Patent No.: US 11,541,343 B2
(45) Date of Patent: Jan. 3, 2023

(54) ELECTRICAL APPLIANCE WITH ELECTROSTATIC DUST COLLECTING DEVICE USING CARBON FIBER

(71) Applicant: Samsung Electronics Co., Ltd., Suwon-si (KR)

(72) Inventors: Kyuho Shin, Suwon-si (KR); Yasuhiko Kochiyama, Suwon-si (KR); Soyoung Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 367 days.

(21) Appl. No.: 16/678,241

(22) Filed: Nov. 8, 2019

(65) Prior Publication Data
US 2020/0188830 A1 Jun. 18, 2020

(30) Foreign Application Priority Data

Dec. 14, 2018 (KR) .......................... 10-2018-0161693
Jun. 17, 2019 (KR) .......................... 10-2019-0071363

(51) Int. Cl.
*B01D 46/00* (2022.01)
*B03C 3/12* (2006.01)
(Continued)

(52) U.S. Cl.
CPC .............. *B01D 46/785* (2022.01); *B03C 3/12* (2013.01); *B03C 3/38* (2013.01); *B03C 3/41* (2013.01);
(Continued)

(58) Field of Classification Search
CPC combination set(s) only.
See application file for complete search history.

(56) References Cited

U.S. PATENT DOCUMENTS 5,958,112 A  9/1999 Nojima
9,263,858 B2 * 2/2016 Lee .......................... H01T 23/00
(Continued)

FOREIGN PATENT DOCUMENTS

EP  2803916  * 11/2014
JP  3020872    11/1995
(Continued)

OTHER PUBLICATIONS

Extended European Search Report dated May 8, 2020 in European Patent Application No. 19212984.9.

*Primary Examiner* — Christopher P Jones
*Assistant Examiner* — Sonji Turner
(74) *Attorney, Agent, or Firm* — Staas & Halsey LLP

(57) ABSTRACT

An electrical appliance having an electrostatic dust collecting device includes a main body including an inlet; a charging device disposed on the main body at an edge of the inlet and configured to charge contaminants in air; an air moving device disposed inside the main body and configured to suck air containing contaminants and exhaust the air to an outside; and a dust collecting device disposed in an air passage and configured to collect contaminants charged by the charging device from the air. The charging device includes a plurality of carbon fiber electrodes disposed toward the inlet and configured to generate electrons to charge contaminants; a printed circuit board on which the plurality of carbon fiber electrodes are disposed; and a ground electrode disposed adjacent to the printed circuit board without facing the plurality of carbon fiber electrodes.

20 Claims, 34 Drawing Sheets

(51) Int. Cl.
*B03C 3/38* (2006.01)
*B03C 3/41* (2006.01)
*F24F 1/0071* (2019.01)
*F24F 3/16* (2021.01)
*B01D 46/66* (2022.01)
*F24F 8/10* (2021.01)
*F24F 8/192* (2021.01)

(52) U.S. Cl.
CPC .............. *F24F 1/0071* (2019.02); *F24F 8/10* (2021.01); *F24F 8/194* (2021.01)

(56) References Cited

U.S. PATENT DOCUMENTS

| | | | |
|---|---|---|---|
| 9,746,192 B2 * | 8/2017 | Lee | ............ F24F 1/008 |
| 9,873,128 B2 * | 1/2018 | Kim | ............ B01D 53/323 |
| 10,315,201 B2 * | 6/2019 | Lee | ............ B03C 3/47 |
| 10,537,901 B2 * | 1/2020 | Lee | ............ B03C 3/41 |
| 10,814,335 B2 * | 10/2020 | Clavaguera | ............ B03C 3/025 |
| 2016/0102589 A1 | 4/2016 | Kim et al. | |
| 2016/0204581 A1 | 7/2016 | Nishida et al. | |
| 2017/0007953 A1 | 1/2017 | Lee et al. | |
| 2017/0203305 A1 | 7/2017 | Lee | |
| 2020/0188830 A1 * | 6/2020 | Shin | ............ F24F 8/10 |
| 2020/0188930 A1 | 6/2020 | Kochiyama et al. | |

FOREIGN PATENT DOCUMENTS

| | | | | |
|---|---|---|---|---|
| JP | 2006-132928 | 5/2006 | | |
| JP | 2009-198077 | 9/2009 | | |
| KR | 10-0253427 | 4/2000 | | |
| KR | 10-2014-0005623 | 1/2014 | | |
| KR | 10-1453499 | 10/2014 | | |
| KR | 10-2018-0008063 | 1/2018 | | |
| KR | 10-2018-0008064 | 1/2018 | | |
| KR | 10-2018-0022063 | 3/2018 | | |
| KR | 10-2018-0043561 | 4/2018 | | |
| KR | 10-2020-0073585 | 6/2020 | | |
| WO | 2014/007558 | 1/2014 | | |
| WO | 2014/185682 | 11/2014 | | |
| WO | WO-2014185682 A1 * | 11/2014 | ............ | F24F 13/20 |
| WO | WO-2015151309 A1 * | 10/2015 | ............ | H01T 19/04 |

* cited by examiner

500

RELATED ART

ELECTRICAL APPLIANCE WITH ELECTROSTATIC DUST COLLECTING DEVICE USING CARBON FIBER

CROSS-REFERENCE TO RELATED APPLICATIONS

This application is based on and claims priority under 35 U.S.C. § 119 to Korean Patent Application No. 10-2018-0161693, filed on Dec. 14, 2018 and Korean Patent Application No. 10-2019-0071363, filed on Jun. 17, 2019, in the Korean Intellectual Property Office, the disclosures of which are incorporated by reference herein in their entirety.

BACKGROUND

1. Field

The present disclosure relates to an electrical appliance having an electrostatic dust collecting device, and more particularly to an electrical appliance having an electrostatic dust collecting device using carbon fibers.

2. Description of the Related Art

There are a variety of dust collecting devices that can remove particulate contaminants such as dust from contaminated air to make clean air.

An example of an electric dust collecting device for charging and collecting contaminants by using a high voltage is shown in FIG. 1.

Referring to FIG. 1, an electric dust collecting device 500 includes a charging part 510 and a dust collecting part 520 disposed downstream of the charging part 510.

The charging part 510 is composed of a discharging electrode 511 and a pair of ground plates 513. The discharging electrode 511 is formed as a wire electrode provided at the center of the pair of ground plates 513. A tungsten wire is generally used as the discharging electrode 511. The pair of ground plates 513 are provided on the upper and lower sides of the discharging electrode 511. When a high voltage is applied between the discharging electrode 511 and the ground plates 513, a corona discharge is generated in the discharging electrode 511, and a hemispherical electric field is formed between the discharging electrode 511 and the ground plates 513.

The dust collecting part 520 has a structure in which a plurality of flat positive electrodes 521 and a plurality of flat negative electrodes 522 are stacked at regular intervals. Therefore, when a predetermined voltage is applied between the positive electrode 521 and the negative electrode 522 of the dust collecting part 520, an electric field is formed between the positive electrode 521 and the negative electrode 522.

Accordingly, when air conveyed by an air moving device (not illustrated) passes through the charging part 510, contaminants in the air are charged to have a positive (+) polarity. The contaminants charged to have a positive polarity are attached to the negative electrode 522 and removed from the air while passing through the dust collecting part 520. Therefore, the dust collecting part 520 discharges clean air from which the contaminants are removed.

However, in the electric dust collecting device 500 using the corona discharge as described above, power consumption is large, and a large amount of ozone is generated due to the corona discharge. An ozone treatment apparatus may be provided to solve the problem of ozone, but this raises the cost of the dust collecting device.

Further, in order to solve such a problem, a dust collecting device for charging contaminants by using a carbon fiber as an electrode has been developed and used. However, in the dust collecting device using the carbon fiber, the emission of electrons is unstable and there is a fear that a person may be subjected to electric shock when he or she comes into contact with the tip of the carbon fiber.

SUMMARY

Additional aspects will be set forth in part in the description which follows and, in part, will be apparent from the description, or may be learned by practice of the presented embodiments.

The present disclosure has been developed in order to overcome the above drawbacks and other problems associated with the conventional arrangement. An aspect of the present disclosure relates to an electrical appliance having an electrostatic dust collecting device using carbon fibers capable of stably generating electrons.

An aspect of the present disclosure relates to an electrical appliance having an electrostatic dust collecting device using carbon fibers which can prevent a person from being in contact with a tip of the carbon fiber and subjected to electric shock.

According to an aspect of the present disclosure, an electrical appliance having an electrostatic dust collecting device using carbon fibers may include a main body including an inlet; a charging device disposed on an outer surface of the main body at an edge of the inlet, the charging device configured to charge contaminants contained in air flowing into the inlet; an air moving device disposed inside the main body and configured to suck air containing contaminants and exhaust the air to an outside of the main body; and a dust collecting device disposed in an air passage through which the air sucked by the air moving device provided in the main body passes, the dust collecting device configured to collect contaminants charged by the charging device from the air, wherein the charging device may include a plurality of carbon fiber electrodes disposed toward the inlet and configured to generate electrons to charge surrounding contaminants; a printed circuit board on which the plurality of carbon fiber electrodes are disposed; and a ground electrode disposed behind the printed circuit board opposite to the plurality of carbon fiber electrodes.

The electrical appliance may include a plurality of electron blocking plates disposed between the charging device and the dust collecting device and configured to block electrons emitted from the plurality of carbon fiber electrodes of the charging device from flowing into the dust collecting device, wherein the plurality of electron blocking plates may be disposed to correspond one-to-one with the plurality of carbon fiber electrodes.

The charging device may be fixed to a charging device holder provided in the main body, and the plurality of electron blocking plates may be provided in the charging device holder at regular intervals.

The electrical appliance may include a housing in which the plurality of carbon fiber electrodes, the printed circuit board, and the ground electrode are accommodated, wherein the housing may include an opening spaced apart by a predetermined distance from tips of the plurality of carbon fiber electrodes and through which outside air is introduced.

The ground electrode may be disposed on a rear surface of the housing spaced apart from an opposite surface of the printed circuit board opposite to the plurality of carbon fiber electrodes disposed on one surface of the printed circuit board.

The ground electrode may be disposed on an upper surface or a lower surface of the housing spaced apart from an opposite surface of the printed circuit board opposite to the plurality of carbon fiber electrodes disposed on one surface of the printed circuit board.

The plurality of electron blocking plates may be provided on a lower surface of the housing.

The electrical appliance may include a protection grille disposed in the opening of the housing.

The protection grille may include any one of a triangle pattern, a square pattern, a pentagonal pattern, a hexagonal pattern, a rhombus pattern, a circular pattern, and an oval pattern.

A rear opening may be provided in a rear surface of the housing.

Each of the plurality of carbon fiber electrodes may include an electrode bar fixed to the printed circuit board; and a plurality of carbon fibers disposed on a tip of the electrode bar.

The plurality of carbon fiber electrodes may be disposed in parallel to the printed circuit board, and the ground electrode may be disposed on the printed circuit board and positioned on an opposite side of the plurality of carbon fibers based on the electrode bars of the plurality of carbon fiber electrodes.

The charging device may be disposed on the outer surface of the main body at a position where the charging device does not interfere with a projection area of the inlet.

The electrical appliance may include an air conditioner, an air purifier, a dehumidifier, a humidifier, a clothes manager, a refrigerator, and a dryer.

According to an aspect of the present disclosure, an electrical appliance including an electrostatic dust collecting device using carbon fibers may include a main body including an inlet, an outlet, and an air passage connecting the inlet and the outlet; a charging device disposed on an outer surface of the main body at an edge of the inlet, the charging device configured to charge contaminants contained in air flowing into the inlet; an air moving device disposed inside the main body and configured to suck air containing contaminants through the inlet and exhaust the air to an outside of the main body through the outlet; a dust collecting device disposed in the air passage provided inside the main body, the dust collecting device configured to collect contaminants charged by the charging device from the air; and a plurality of electron blocking plates disposed between the charging device and the dust collecting device, the plurality of electron blocking plates configured to block electrons emitted from the charging device from flowing into the dust collecting device, wherein the charging device may include a plurality of carbon fiber electrodes disposed toward the inlet and configured to generate electrons to charge contaminants; a printed circuit board on which the plurality of carbon fiber electrodes are disposed; a housing configured to fix the printed circuit board and accommodate the plurality of carbon fiber electrodes; and a ground electrode disposed behind the printed circuit board opposite to the plurality of carbon fiber electrodes in the housing, and wherein the plurality of electron blocking plates may be disposed to correspond one-to-one with the plurality of carbon fiber electrodes.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

DETAILED DESCRIPTION

Figure 1:
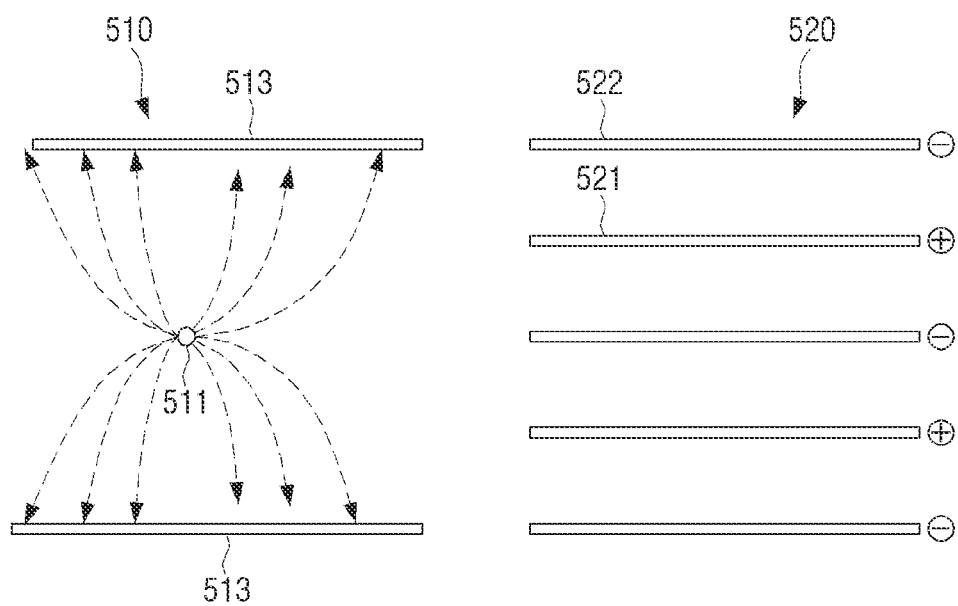
FIG. 1 is a view illustrating a conventional electric dust collecting device.

Hereinafter, various embodiments of the present disclosure will be described in detail with reference to the accompanying drawings.

It should be understood that the disclosure is not limited to the example embodiments described hereinafter, but includes various modifications, equivalents, and/or alternatives of the examples of the disclosure. In relation to explanation of the drawings, similar drawing reference numerals may be used for similar constituent elements. Further, dimensions of various elements in the accompanying drawings may be arbitrarily increased or decreased for assisting in a comprehensive understanding.

In the disclosure, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope of the disclosure, the first element may be called the second element, and the second element may be called the first element in a similar manner.

The terms used in the disclosure are used to merely describe various examples, but is not intended to limit the scope of other examples. In the disclosure, a singular expression may include a plural expression unless specially described. All terms (including technical and scientific terms) used in the disclosure could be used as commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. Even the wordings that are defined in the present disclosure must not be interpreted to exclude all examples of the disclosure.

Hereinafter, an electrical appliance including an electrostatic dust collecting device using carbon fibers an embodiment of the present disclosure will be described in detail with reference to the accompanying drawings.

Figure 2:
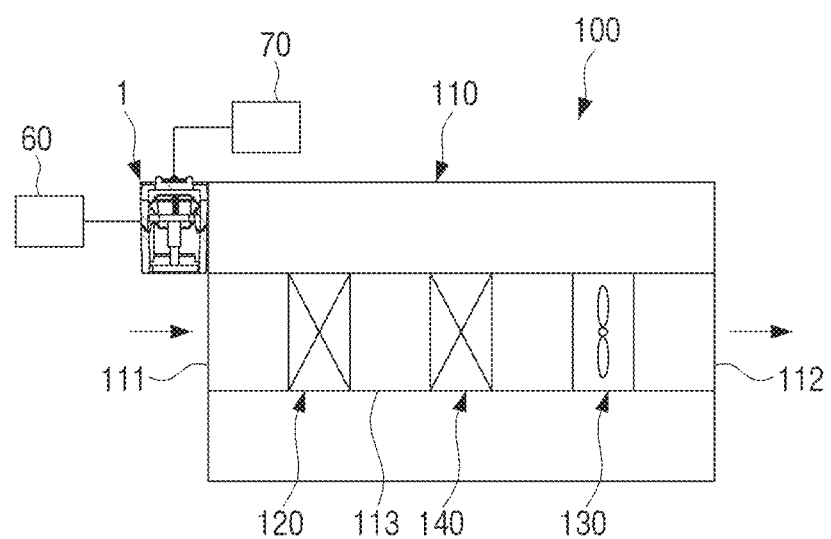
FIG. 2 is a conceptual view illustrating an electrical appliance including an electrostatic dust collecting device using carbon fibers according to an embodiment of the present disclosure.

FIG. 2 is a conceptual view illustrating an electrical appliance including an electrostatic dust collecting device using carbon fibers according to an embodiment of the present disclosure.

Referring to FIG. 2, an electrical appliance 100 including an electrostatic dust collecting device using carbon fibers according to an embodiment of the present disclosure may include a main body 110, a charging device 1, an air moving device 130, and a dust collecting device 120.

The main body 110 forms an outer shape of the electrical appliance 100 and may have various shapes depending on the type of the electrical appliance 100. The electrical appliance 100 may be any one of an air purifier, an air conditioner, a dehumidifier, a humidifier, a clothes manager, a refrigerator, a dryer, and the like. The main body 110 may be provided with an inlet 111 through which outside air is sucked, an outlet 112 through which the sucked air is exhausted, and an air passage 113 connecting the inlet 111 and the outlet 112.

The charging device 1 is provided near the inlet 111 of the main body 110 and is configured to charge contaminants such as dust contained in the air sucked into the inlet 111 using carbon fibers. The charging device 1 may be disposed on the outer surface of the main body 110 at the edge of the inlet 111. In other words, the charging device 1 may be disposed on the outer surface of the main body 110 so as not to interfere with the projection area of the inlet 111. When the charging device 1 is provided outside the inlet 111 so that the charging device 1 does not block the inlet 111, the amount of air sucked into the inlet 111 is not reduced. The configuration of the charging device 1 will be described in detail below.

The air moving device 130 is disposed inside the main body 110 and is configured to suck outside air containing contaminants through the inlet 111 and to exhaust the outside air to the outside of the main body 110. In other words, when the air moving device 130 operates, air containing contaminants is introduced into the inlet 111 of the main body 110, flows along the air passage 113, and is exhausted through the outlet 112. The air moving device 130 may use a fan that can generate a suction force capable of sucking air.

The dust collecting device 120 is disposed in the air passage 113 provided inside the main body 110 and is configured to collect the contaminants charged by the charging device 1 from the air sucked by the air moving device 130. For example, the dust collecting device 120 may include a plurality of dust collecting plates spaced by a predetermined distance apart from each other and a dust collecting voltage applier configured to apply a high voltage to the plurality of dust collecting plates. When a high voltage is applied to the plurality of dust collecting plates by the dust collecting voltage applier, the contaminants charged in combination with electrons generated in the charging device 1 may be collected in the plurality of dust collecting plates. Therefore, because the contaminants contained in the sucked outside air are removed by the dust collecting device 120, cleaned air is exhausted from the dust collecting device 120.

The charging device 1, the dust collecting device 120, and the air moving device 130 as described above may constitute an electrostatic dust collecting device using carbon fibers according to an embodiment of the present disclosure.

The main body 110 may further include a processing part 140 that performs a predetermined process on the sucked air. For example, when the electrical appliance 100 is implemented as an air conditioner, the main body 110 may be provided with a heat exchanger capable of performing heat exchange with the sucked air as the processing part 140. When the electrical appliance 100 is a dehumidifier, the main body 110 may be provided with a dehumidifying device capable of removing moisture from the sucked air as the processing part 140. In addition, when the electrical appliance 100 is a humidifier, the main body 110 may be provided with a humidifying device capable of adding moisture to the sucked air as the processing part 140.

In the case where the electrical appliance 100 is an air cleaner implemented by an electrostatic dust collecting device according to an embodiment of the present disclosure, the processing part 140 may not exist in the main body 110.

When the electrical appliance 100 is a clothes manager, a refrigerator, a dryer, or the like, to which the electrostatic dust collecting device according to an embodiment of the present disclosure is additionally provided, the processing part 140 may not be included inside the main body 110.

Hereinafter, the charging device 1 used in the electrostatic dust collecting device using carbon fibers according to an embodiment of the present disclosure will be described in detail with reference to FIGS. 3 to 7.

Figure 3:
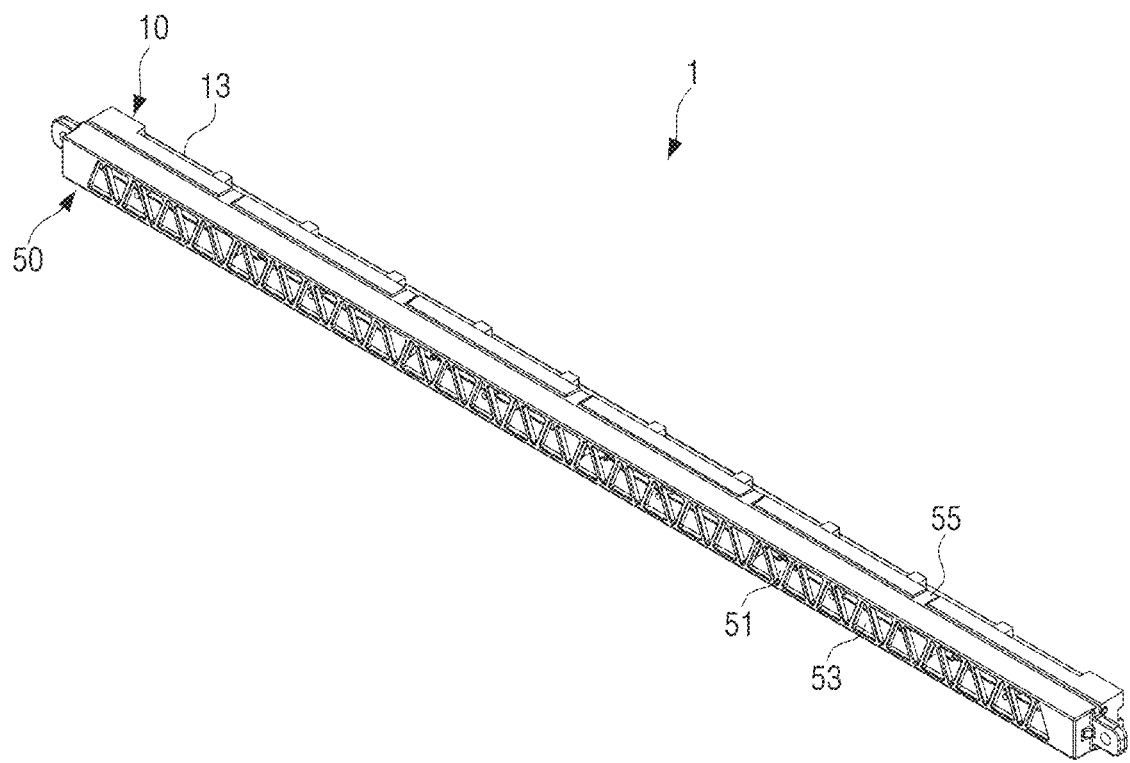
FIG. 3 is a perspective view illustrating a charging device of an electrostatic dust collecting device using carbon fibers according to an embodiment of the present disclosure.
Figure 4:
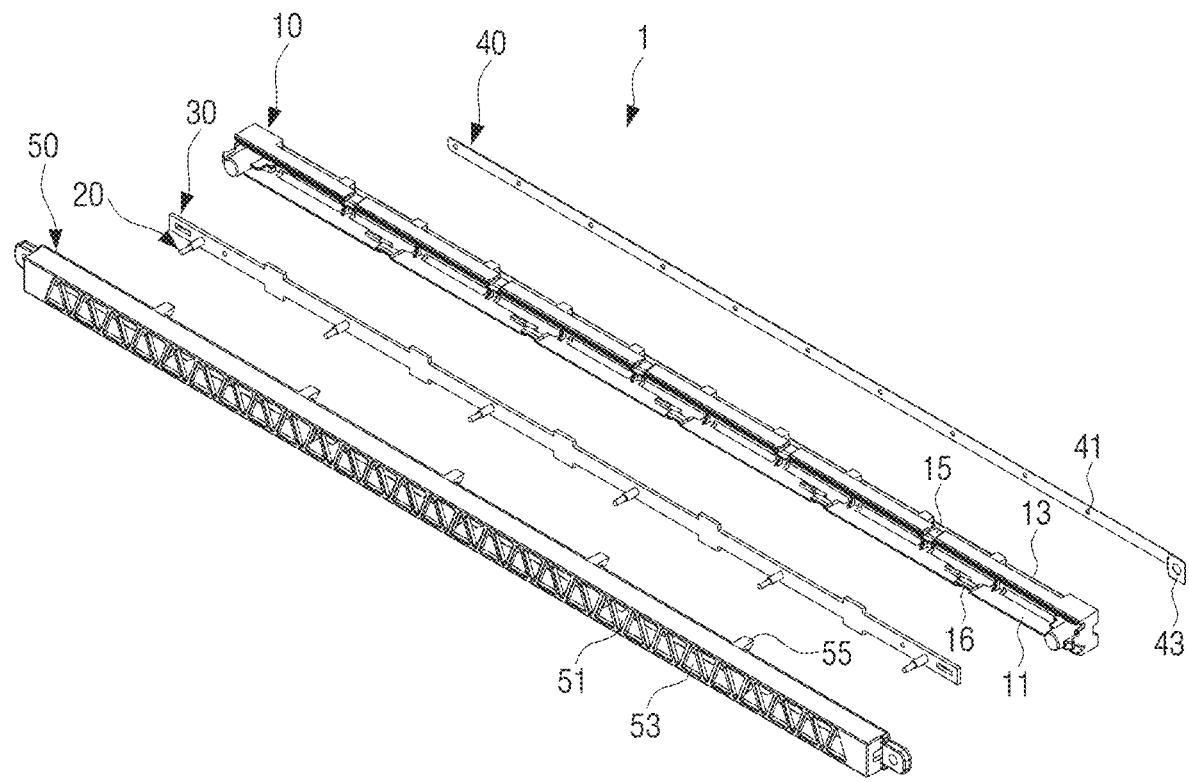
FIG. 4 is an exploded perspective view illustrating the charging device of FIG. 3.
Figure 5:
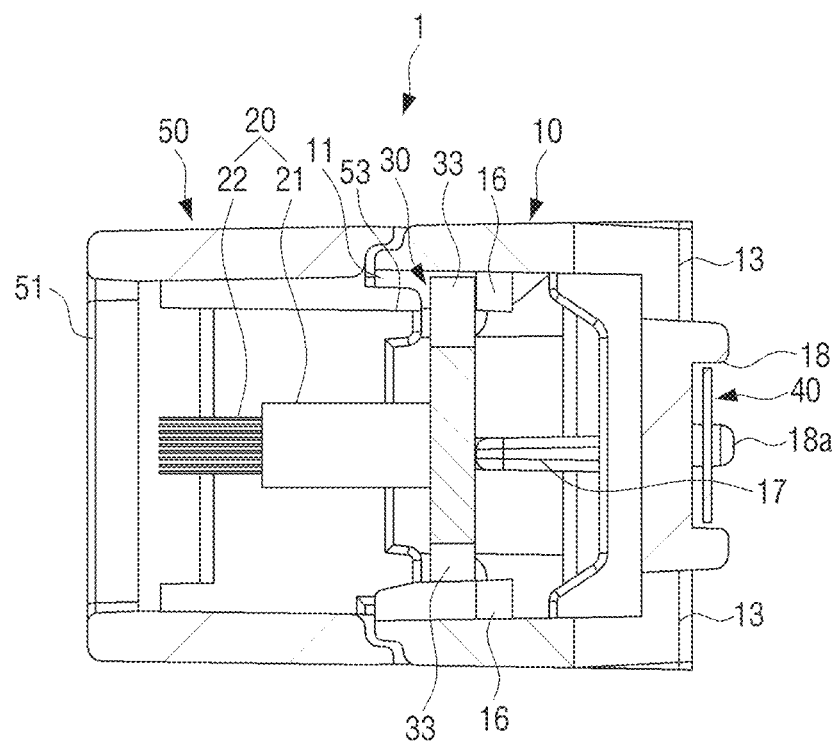
FIG. 5 is a cross-sectional view illustrating the charging device of FIG. 3.
Figure 6:
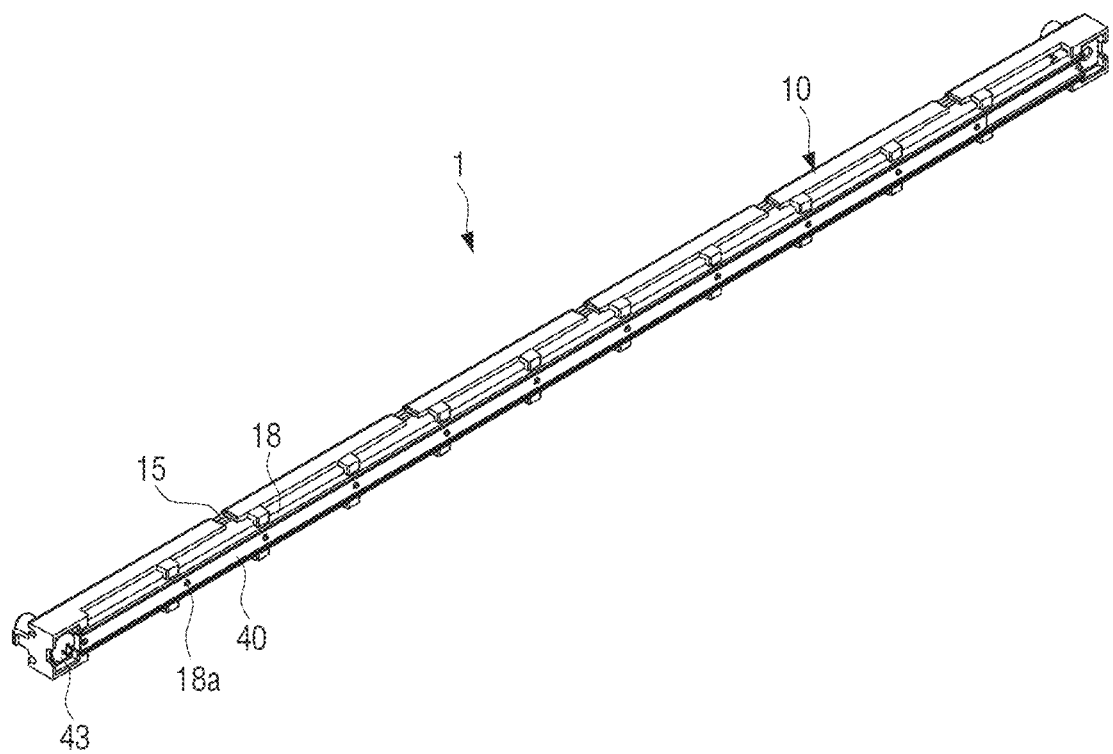
FIG. 6 is a rear perspective view illustrating the charging device of FIG. 3.
Figure 7:
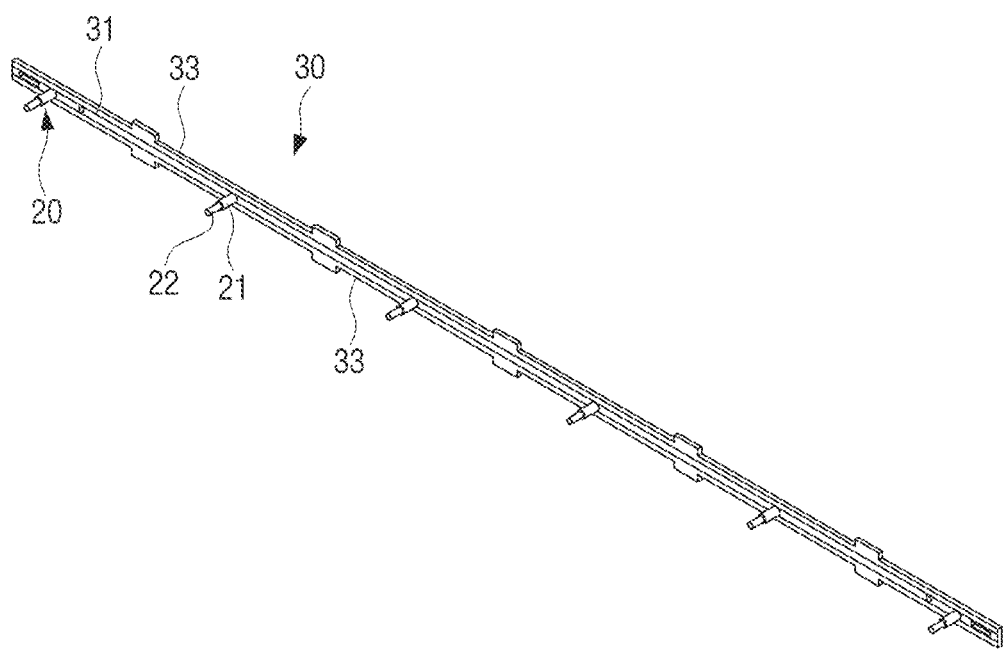
FIG. 7 is a perspective view illustrating a printed circuit board of the charging device of FIG. 3 on which a plurality of carbon fiber electrodes are disposed.

FIG. 3 is a perspective view illustrating a charging device of an electrostatic dust collecting device using carbon fibers according to an embodiment of the present disclosure. FIG. 4 is an exploded perspective view illustrating the charging device of FIG. 3, and FIG. 5 is a cross-sectional view illustrating the charging device of FIG. 3. FIG. 6 is a rear perspective view illustrating the charging device of FIG. 3. FIG. 7 is a perspective view illustrating a printed circuit board of the charging device of FIG. 3 on which a plurality of carbon fiber electrodes are disposed.

Referring to FIGS. 3 to 7, the charging device 1 of the electrostatic dust collecting device using carbon fibers according to an embodiment of the present disclosure may include a housing 10, a plurality of carbon fiber electrodes 20, a printed circuit board 30, and a ground electrode 40.

The housing 10 is formed to accommodate the plurality of carbon fiber electrodes 20 and the printed circuit board 30. An opening 11 is formed on one surface of the housing 10 facing the tips of the plurality of carbon fiber electrodes 20, that is, on the front surface of the housing 10. A rear opening 13 may be provided on the opposite side of the one surface of the housing 10, that is, on the rear surface of the housing 10. The plurality of carbon fiber electrodes 20 may be exposed through the opening 11 of the housing 10. Therefore, the housing 10 is formed so that the outside air can flow through the inside of the housing 10.

In the case of the present embodiment, as illustrated in FIG. 4, the housing 10 is formed in a substantially hollow rectangular parallelepiped shape having a long length. The printed circuit board 30 to which the plurality of carbon fiber electrodes 20 are fixed is provided inside the housing 10.

The plurality of carbon fiber electrodes 20 are configured to generate electrons at the tip of each of the carbon fiber electrodes 20 when a high voltage is applied thereto. The plurality of carbon fiber electrodes 20 are disposed such that the tips of the carbon fiber electrodes 20 face the opening 11 of the housing 10. Therefore, the electrons generated from the plurality of carbon fiber electrodes 20 are emitted to the outside through the opening 11 of the housing 10. When the charging device 1 is disposed in the electrical appliance 100 such that the opening 11 of the housing 10 faces the inlet 111 of the main body 110 as illustrated in FIG. 2, the tips of the plurality of carbon fiber electrodes 20 are arranged to face the inlet 111. Accordingly, because electrons generated from the plurality of carbon fiber electrodes 20 are emitted to the outside through the opening 11 of the housing 10, the contaminants contained in the air sucked into the inlet 111 may be charged.

The plurality of carbon fiber electrodes 20 are provided on the printed circuit board 30 at regular intervals. The plurality of carbon fiber electrodes 20 are arranged on the printed circuit board 30 in a straight line. In addition, the plurality of carbon fiber electrodes 20 are disposed on the printed circuit board 30 at the same height.

The printed circuit board 30 is provided with a power supply line 31 capable of applying power to the plurality of carbon fiber electrodes 20. A high voltage applying part 60 is connected to the power supply line 31 of the printed circuit board 30. Therefore, a high voltage may be applied to the plurality of carbon fiber electrodes 20 through the power supply line 31 of the printed circuit board 30. For example, the high voltage applying part 60 may be configured to apply a voltage of about 6 kV to the plurality of carbon fiber electrodes 20 through the power supply line 31 of the printed circuit board 30.

The printed circuit board 30 may be provided with a plurality of holes through which the air drawn into housing 10 passes. In the present embodiment, as illustrated in FIG. 7, a plurality of notched portions 33 through which air passes are provided on both side surfaces of the printed circuit board 30. Therefore, the plurality of notched portions 33 of the printed circuit board 30 performs the function of a plurality of holes through which the air passes. The printed circuit board 30 is formed in a rectangular plate corresponding to the opening 11 of the housing 10 so that the printed circuit board 30 may be inserted into the housing 10. The plurality of notched portions 33 having a predetermined depth are formed on both side surfaces of the printed circuit board 30. Thus, the air introduced into the housing 10 may flow through the plurality of notched portions 33 of the printed circuit board 30.

In addition, the printed circuit board 30 is supported by a plurality of supporting portions 16 provided inside the housing 10. The plurality of supporting portions 16 may be provided on the inner surfaces of the upper surface and the lower surface of the housing 10 so as to support the printed circuit board 30. In addition, a center supporting portion 17 may be provided on the inner surface of each of both ends of the housing 10 to support the both ends of the printed circuit board 30.

The plurality of carbon fiber electrodes 20 may include an appropriate number of carbon fiber electrodes 20 to emit electrons to all the air sucked into the inlet 111 of the main body 110. In the embodiment shown in FIGS. 4 and 7, six carbon fiber electrodes 20 are provided on the printed circuit board 30, but this is merely an example. The number of the plurality of carbon fiber electrodes 20 and the distance between the two adjacent carbon fiber electrodes 20 may be appropriately determined depending on the size of the inlet 111 of the main body 110 in which the charging device 1 is disposed.

In addition, the printed circuit board 30 is formed to have a length capable of supporting the plurality of carbon fiber electrodes 20 arranged in a single line. For example, the printed circuit board 30 on which the plurality of carbon fiber electrodes 20 are disposed may be formed to have a length equal to or greater than ⅓ of the length of the inlet 111 of the main body 110.

Each of the plurality of carbon fiber electrodes 20 may include an electrode bar 21 fixed to the printed circuit board 30 and a plurality of carbon fibers 22 disposed at the tip of the electrode bar 21.

The electrode bar 21 may be formed in a substantially cylindrical shape so as to support the plurality of carbon fibers 22 and be fixed to the printed circuit board 30. In other words, one end of the electrode bar 21 is fixed to the printed circuit board 30, and the plurality of carbon fibers 22 are provided at the other end of the electrode bar 21. Further, the electrode bar 21 is electrically connected to the power supply line 31 of the printed circuit board 30. The electrode bar 21 may be formed of a conductive material to apply power to the plurality of carbon fibers 22.

In the present embodiment, the electrode bar 21 is formed in a cylindrical shape having a circular cross-section, but the shape of the electrode bar 21 is not limited thereto. The electrode bar 21 may be formed in various shapes as long as the electrode bar 21 can fix the plurality of carbon fibers 22 to the printed circuit board 30. As an example, the electrode bar 21 may be formed in a columnar shape having a cross-section of a polygonal shape such as a quadrangle, a pentagon, and the like, or an elliptical shape.

The plurality of carbon fibers 22 are fixed to one end of the electrode bar 21 in the form of a bundle. In other words, the plurality of carbon fibers 22 may have a brush shape. The plurality of carbon fibers 22 are spaced apart from each other so as not to contact each other. Each of the plurality of carbon fibers 22 may be formed to have a diameter of about 6 μm to 8 μm.

Therefore, when a high voltage is applied to the printed circuit board 30, electrons are emitted from the tips of the plurality of carbon fibers 22 and charge the contaminants contained in the air. In other words, the electrons emitted from the tips of the plurality of carbon fibers 22 are combined with contaminants c to charge the contaminants to become anions (negative ions) c−(e−+c=c−).

The ground electrode 40 maintains a predetermined potential difference between each of the plurality of carbon fiber electrodes 20 and the surrounding air so that a predetermined amount of electrons is generated from the plurality of carbon fiber electrodes 20 even after a lapse of time. For this purpose, the ground electrode 40 is disposed around the plurality of carbon fiber electrodes 20. For example, the ground electrode 40 may be disposed in the vicinity of the printed circuit board 30 so as not to face the tips of the plurality of carbon fiber electrodes 20. In other words, the ground electrode 40 may be disposed behind the printed circuit board 30 on the opposite side of one side surface of the printed circuit board 30 on which the plurality of carbon fiber electrodes 20 are provided or the plurality of carbon fiber electrodes 20.

For example, as illustrated in FIGS. 5 and 6, the ground electrode 40 may be disposed on the rear surface of the housing 10. To this end, an electrode fixing portion 18 to which the ground electrode 40 is fixed may be provided on the rear surface of the housing 10. Thus, the ground electrode 40 may be disposed on the rear surface of the housing 10 spaced apart by a predetermined distance from the opposite surface of the printed circuit board 30 opposite to the plurality of carbon fiber electrodes 20 provided on one surface of the printed circuit board 30. At this time, the rear opening 13 of the housing 10 may be provided on the rear surface of the housing 10 on both sides of the ground electrode 40.

The ground electrode 40 is formed of a conductive thin metal plate and is formed to have a length corresponding to the length of the printed circuit board 30 so that all of the plurality of carbon fiber electrodes 20 may maintain a predetermined potential difference. As illustrated in FIG. 4, in the case of the present embodiment, the ground electrode 40 is formed of a thin strip-shaped metal plate.

In addition, the ground electrode 40 may include a plurality of through holes 41. A plurality of fixing pins 18a corresponding to the plurality of through holes 41 of the ground electrode 40 are provided in the electrode fixing portion 18 of the housing 10. Therefore, when the plurality of fixing pins 18a of the housing 10 are inserted into the plurality of through holes 41 of the ground electrode 40, the ground electrode 40 is fixed to the electrode fixing portion 18 of the housing 10.

The ground electrode 40 is connected to an external ground 70. For example, the ground electrode 40 may be connected to the external ground 70 by connecting a ground wire (not illustrated) connected to the ground 70 of an external power source to one end 43 of the ground electrode 40. As described above, when the ground electrode 40 is connected to the external ground 70, ions saturated in the periphery of the plurality of carbon fiber electrodes 20 are discharged to the external ground 70 through the ground electrode 40, so that the periphery of the ground electrode 40 may maintain a predetermined potential difference. Therefore, the plurality of carbon fiber electrodes 20 may always generate electrons stably regardless of the passage of time.

The inventors conducted experiments to compare the amount of electrons generated in the charging device 1 according to an embodiment of the present disclosure having the ground electrode 40 and the amount of electrons generated in the conventional charging device without the ground electrode.

Figure 8:
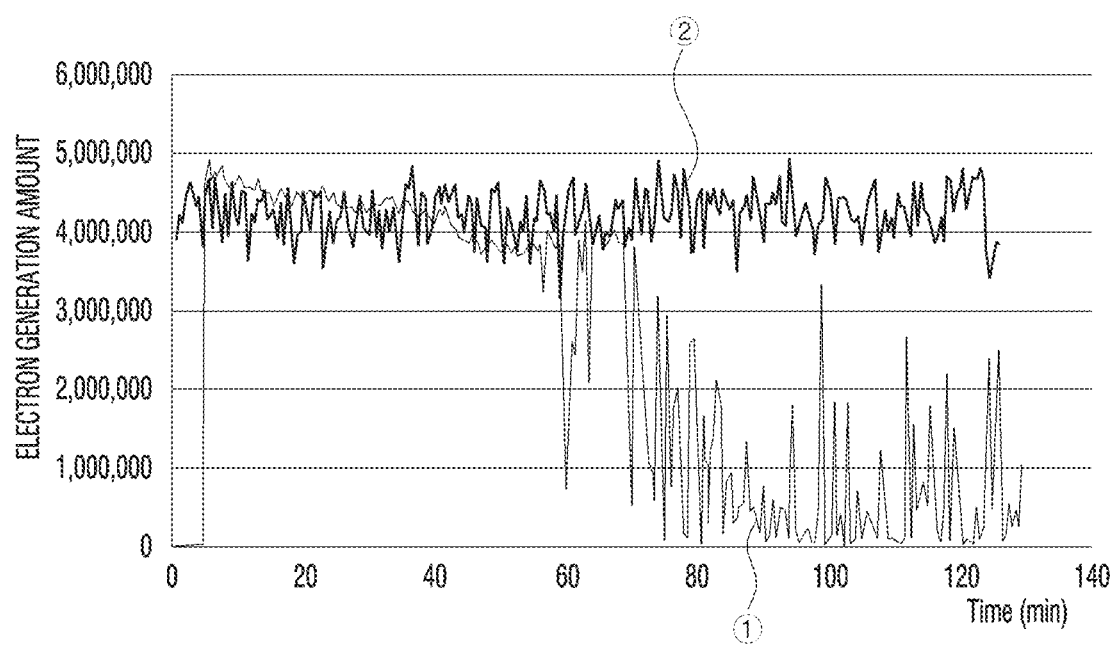
FIG. 8 is a graph comparing an electron generation amount of a charging device according to an embodiment of the present disclosure having a ground electrode with an electron generation amount of a conventional charging device without a ground electrode.

FIG. 8 is a graph comparing an electron generation amount of a charging device according to an embodiment of the present disclosure having a ground electrode with an electron generation amount of a conventional charging device without a ground electrode.

In FIG. 8, the horizontal axis represents time (minute), and the vertical axis represents electron generation amount. Further, in FIG. 8, the thin line ① represents the amount of electrons generated in the conventional charging device without the ground electrode, and the thick line ② represents the amount of electrons generated in the charging device 1 according to an embodiment of the present disclosure having the ground electrode 40.

Referring to the thick line ② in FIG. 8, the charging device 1 according to an embodiment of the present disclosure maintains the electron generation amount constant within a range of about 3,600,000 to about 5,000,000 even after an extended amount of time, so that electrons are uniformly generated.

However, referring to the thin line ① in FIG. 8, the conventional charging device maintains the electron generation amount in the range of about 3,600,000 to about 5,000,000 similarly to the charging device 1 of the present disclosure up to about 50 minutes. However, from the point of time exceeding 60 minutes, the amount of electrons generated in the charging device sharply decreases to about 2,000,000 or less, and the electron generation amount intermittently becomes almost zero. In other words, in the conventional charging device without the ground electrode, it can be seen that the electron generation amount is uneven as time passes.

Therefore, the charging device 1 according to an embodiment of the present disclosure having the ground electrode 40 may have a stabilized electron generation amount compared with the conventional charging device without the ground electrode.

In the case in which the plurality of carbon fiber electrodes 20 are exposed to the outside, when a user cleans the electrical appliance 100 equipped with the electrostatic dust collecting device using carbon fibers according to an embodiment of the present disclosure, a hand or a part of the body of the user may contact the plurality of carbon fiber electrodes 20. At this time, because a high voltage is applied to the plurality of carbon fiber electrodes 20, the user may be subjected to electric shock when the hand or a part of the body touches the carbon fiber electrodes 20.

A protection grille 50 may be disposed in the opening 11 of the front surface of the housing 10 facing the plurality of carbon fiber electrodes 20 in order to prevent the electric shock. The protection grille 50 blocks the user's hand or finger from contacting the carbon fiber electrodes 20. The protection grille 50 may be formed in various patterns that block the user's hand or finger and allow air and electrons generated from the plurality of carbon fiber electrodes 20 to pass through.

Referring to FIGS. 3 and 4, the protection grille 50 is formed in a substantially hollow rectangular parallelepiped shape having a long length. The front surface of the protection grille 50 is provided with a pattern portion 51 through which air may be drawn and electrons may be emitted. The rear surface of the protection grille 50 coupled to the housing 10 is open.

A plurality of fixing protrusions for fixing the printed circuit board 30 to the housing 10 may be provided at a rear end of the protection grille 50. When the protection grille 50 is coupled to the opening 11 of the housing 10, the pattern portion 51 of the protection grille 50 is spaced apart by a predetermined distance from the tips of the plurality of carbon fiber electrodes 20 and the printed circuit board 30 is fixed to the inside of the housing 10. Therefore, there is a certain gap between the inner surface of the front surface of the protection grille 50 and the tips of the plurality of carbon fiber electrodes 20 fixed to the housing 10.

In addition, a plurality of fixing hooks 55 for coupling the protection grille 50 to the housing 10 may be provided on the upper surface and the lower surface of the rear end of the protection grille 50. A plurality of fixing grooves 15 to which the plurality of fixing hooks 55 of the protection grille 50 are coupled may be provided on the upper surface and the lower surface of the front end of the housing 10 corresponding thereto.

On the other hand, the pattern portion 51 of the protection grille 50 may be formed in various patterns having holes 53 that blocks the user's hand or finger and through which air and electrons pass.

FIGS. 9A, 9B, 9C, 9D, 9E, 9F, and 9G are views illustrating various patterns of a protection grille of a charging device according to an embodiment of the present disclosure.

Figure 9A:
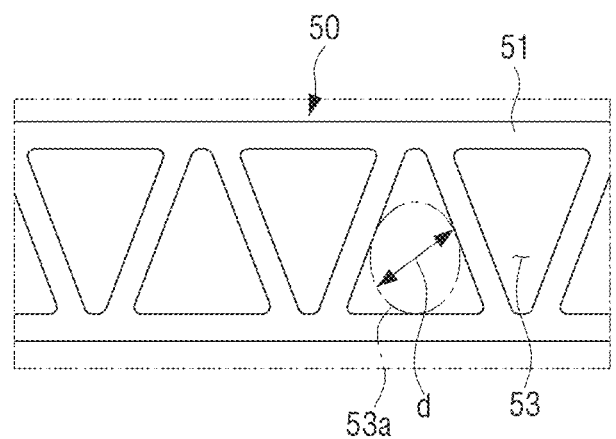
FIGS. 9A, 9B, 9C, 9D, 9E, 9F, and 9G are views illustrating various patterns of a protection grille of a charging device according to an embodiment of the present disclosure.

As illustrated in FIG. 9A, the pattern portion 51 of the protection grille 50 of the charging device 1 may be formed in a triangular pattern in which a plurality of triangular holes 53 are continuously formed. At this time, the diameter d of the inscribed circle 53a of each of the plurality of triangular holes 53 may not exceed about 6 mm.

Figure 9B:
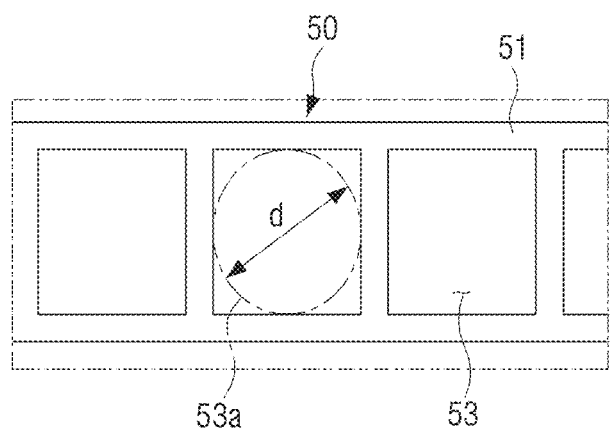

As illustrated in FIG. 9B, the pattern portion 51 of the protection grille 50 of the charging device 1 may be formed in a rectangular pattern in which a plurality of rectangular holes 53 are continuously formed. At this time, the diameter d of the inscribed circle 53a of each of the plurality of rectangular holes 53 may not exceed about 6 mm.

Figure 9C:
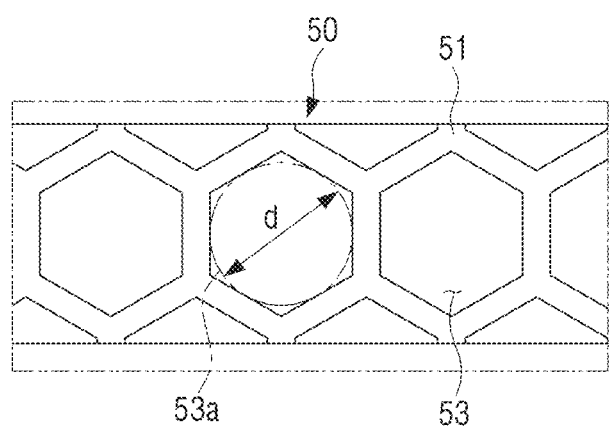

As illustrated in FIG. 9C, the pattern portion 51 of the protection grille 50 of the charging device 1 may be formed in a regular hexagonal pattern in which a plurality of regular hexagonal holes 53 are continuously formed, that is, in a honeycomb pattern. At this time, the diameter d of the inscribed circle 53a of each of the plurality of regular hexagonal holes 53 may not exceed about 6 mm.

Figure 9D:
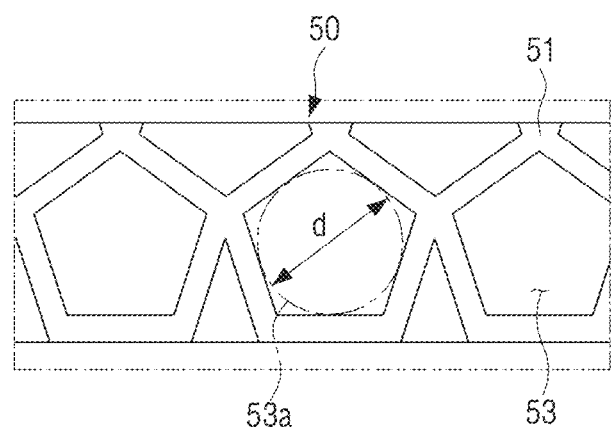

As illustrated in FIG. 9D, the pattern portion 51 of the protection grille 50 of the charging device 1 may be formed in a pentagonal pattern in which a plurality of pentagonal holes 53 are continuously formed. At this time, the diameter d of the inscribed circle 53a of each of the plurality of pentagonal holes 53 may not exceed about 6 mm.

Figure 9E:
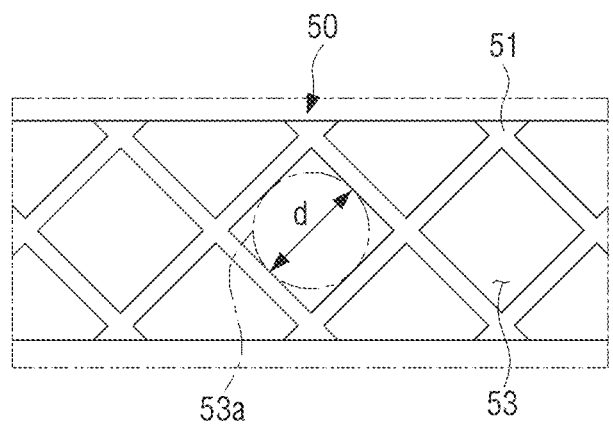

As illustrated in FIG. 9E, the pattern portion 51 of the protection grille 50 of the charging device 1 may be formed in a rhombic pattern in which a plurality of rhombic holes 53 are continuously formed. At this time, the diameter d of the inscribed circle 53a of each of the plurality of rhombic holes 53 may not exceed about 6 mm.

Figure 9F:
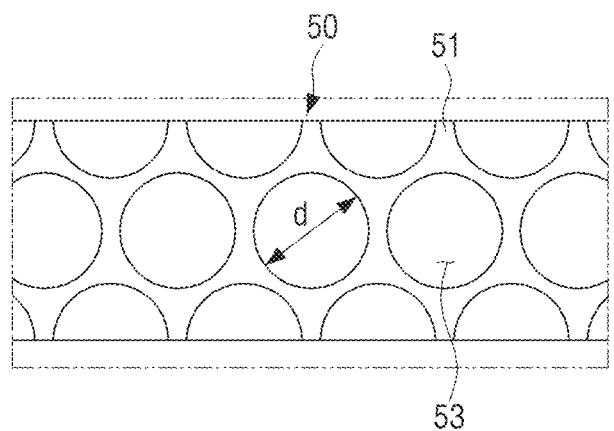

As illustrated in FIG. 9F, the pattern portion 51 of the protection grille 50 of the charging device 1 may be formed in a circular pattern in which a plurality of circular holes 53 are continuously formed. At this time, the diameter d of each of the plurality of circular holes 53 may not exceed about 6 mm.

Figure 9G:
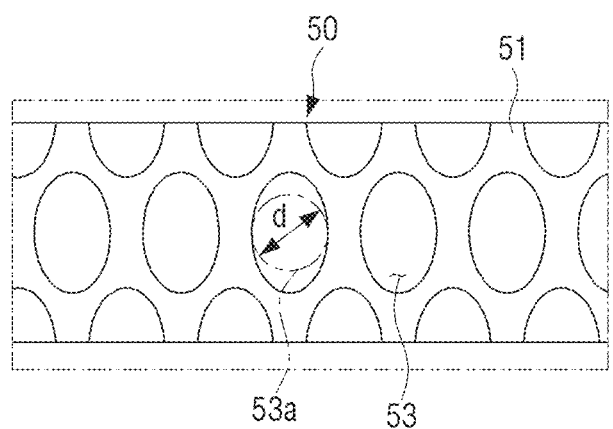

As illustrated in FIG. 9G, the pattern portion 51 of the protection grille 50 of the charging device 1 may be formed in an elliptical pattern in which a plurality of elliptical holes 53 are continuously formed. At this time, the diameter d of the inscribed circle 53a of each of the plurality of elliptical holes 53 may not exceed about 6 mm.

As described above, when the protection grille 50 is provided in the opening 11 of the front surface of the housing 10 in which the plurality of carbon fiber electrodes 20 are accommodated, a part of the body such as the user's finger may be blocked from contacting the plurality of carbon fiber electrodes 20 to be subjected to electric shock. In addition, electrons generated from the plurality of carbon fiber electrodes 20 are emitted to the outside through the plurality of holes 53 provided in the pattern portion 51 of the protection grille 50, thereby effectively charging the contaminants contained in the air passing in front of the protection grille 50.

In the above description, the protection grille 50 is formed in a rectangular parallelepiped shape having a long length and the pattern portion 51 is formed on the front surface of the protection grille 50. However, the shape of the protection grille 50 is not limited thereto. As an example, as illustrated in FIG. 10, the protection grille 50 may be formed in a flat plate shape having the pattern portion 51.

Figure 10:
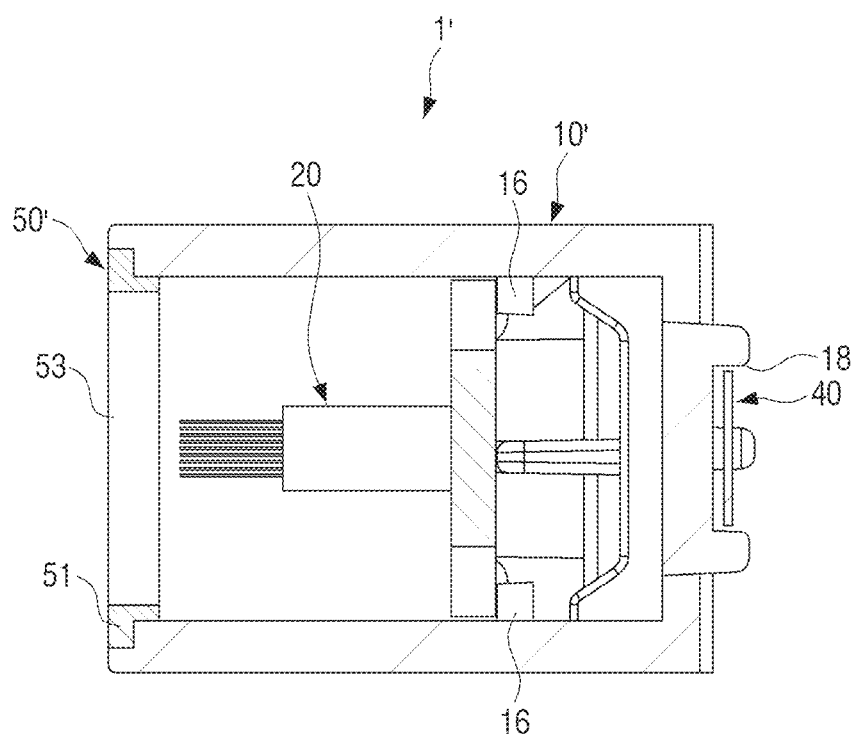
FIG. 10 is a cross-sectional view illustrating an example of a charging device of an electrostatic dust collecting device using carbon fibers according to an embodiment of the present disclosure.

FIG. 10 is a cross-sectional view illustrating an example of a charging device of an electrostatic dust collecting device using carbon fibers according to an embodiment of the present disclosure.

A plurality of carbon fiber electrodes 20, a printed circuit board 30, and a ground electrode 40 of the charging device 1' of FIG. 10 are the same as those of the charging device 1 according to the above-described embodiment except for the shape of the housing 10' and the protection grille 50'. Therefore, detailed descriptions thereof is omitted.

Referring to FIG. 10, the housing 10' is formed in a substantially hollow rectangular parallelepiped shape having a long length and an opening 11 through which the plurality of carbon fiber electrodes 20 are exposed is provided on the front surface of the housing 10'. The front end of the housing 10' is formed higher than the tips of the plurality of carbon fiber electrodes 20. Therefore, in FIG. 10, the tips of the plurality of carbon fiber electrodes 20 are positioned behind the opening 11 of the housing 10'. In addition, an electrode fixing portion 18 on which the ground electrode 40 is disposed is provided on the rear surface of the housing 10' and a rear opening 13 is provided on both sides of the electrode fixing portion 18.

The protection grille 50' is formed in a flat plate shape and is disposed in the opening 11 of the housing 10' to cover the opening 11 of the front surface of the housing 10'. The rear surface of the protection grille 50' is spaced apart by a predetermined distance from the tips of the plurality of carbon fiber electrodes 20. The protection grille 50' is provided with various pattern portion 51 forming a plurality of holes 53 that prevent the user's hand or finger from contacting the plurality of carbon fiber electrodes 20 and through which the air can be introduced. For example, the protection grille 50' may be formed in various patterns as illustrated in FIGS. 9A to 9G.

In the above description, the ground electrode 40 is provided on the rear surface of the housing 10 and 10' of the charging device 1 and 1'. However, the position of the ground electrode 40 of the charging device according to an embodiment of the present disclosure is not limited thereto. Hereinafter, various arrangements of the ground electrode 40 will be described in detain with reference to FIGS. 11 to 13.

Figure 11:
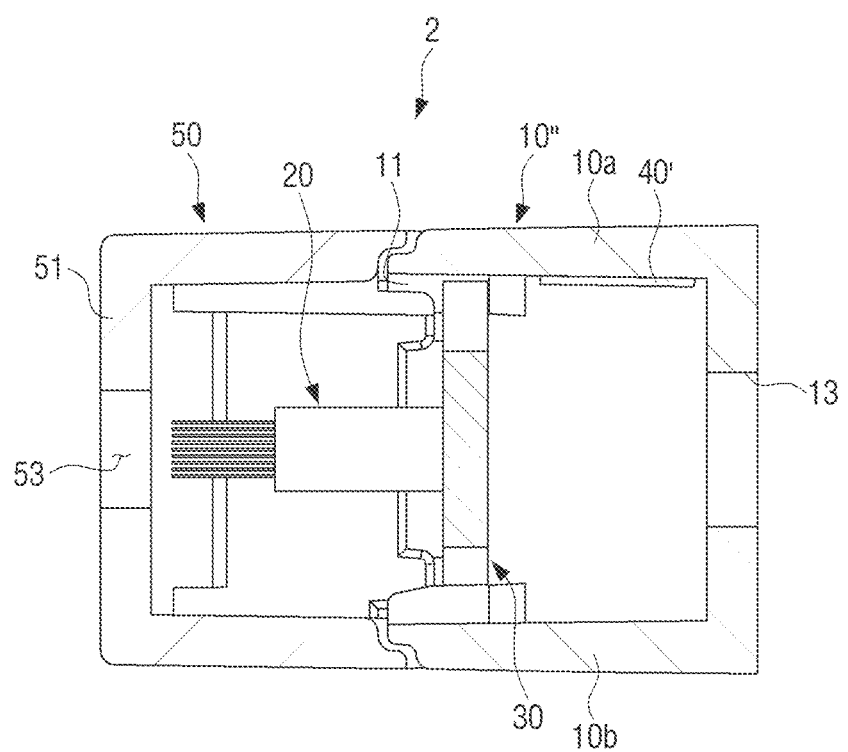
FIG. 11 is a cross-sectional view illustrating an example of a charging device of an electrostatic dust collecting device using carbon fibers according to an embodiment of the present disclosure.

FIG. 11 is a cross-sectional view illustrating an example of a charging device of an electrostatic dust collecting device using carbon fibers according to an embodiment of the present disclosure.

Referring to FIG. 11, a charging device 2 of an electrostatic dust collecting device according to an embodiment of the present disclosure may include a housing 10", a plurality of carbon fiber electrodes 20, a printed circuit board 30, and a ground electrode 40.

The plurality of carbon fiber electrodes 20 and the printed circuit board 30 are the same as or similar to those of the charging device 1 according to the above-described embodiment, and therefore, detailed description thereof is omitted.

The housing 10" is formed to accommodate the plurality of carbon fiber electrodes 20, the printed circuit board 30, and the ground electrode 40'. In other words, the housing 10" is formed in a hollow rectangular parallelepiped shape having a long length. An opening 11 is provided on the front surface of the housing 10" facing the tips of the plurality of carbon fiber electrodes 20 disposed on the printed circuit board 30. A rear opening 13 is provided on the rear surface of the housing 10". The tips of the plurality of carbon fiber electrodes 20 are disposed to face the opening 11 of the housing 10". Therefore, the housing 10" may be formed so that the air flows through the inside of the housing 10".

A protection grille 50 is disposed in the opening 11 of the front surface of the housing 10" to prevent an electric shock. The protection grille 50 may be formed to have holes 53 that block the user's hand or finger and through which air can pass.

For example, the protection grille 50 is formed in a substantially hollow rectangular parallelepiped shape having a long length. The front surface of the protection grille 50 is provided with a pattern portion 51 that blocks the user's hand or finger and through which air can pass. The rear end of the protection grille 50 may be connected to the opening 11 of the housing 10".

When the protection grille 50 is coupled to the opening 11 of the housing 10", the pattern portion 51 of the protection grille 50 is spaced apart by a predetermined distance from the tips of the plurality of carbon fiber electrodes 20. In other words, there is a certain gap between the inner surface of the front surface of the protection grille 50 and the tips of the plurality of carbon fiber electrodes 20. The pattern portion 51 of the protection grille 50 may be formed in various patterns having holes 53 that block the user's hand or finger and through which the air can pass as illustrated in FIGS. 9A to 9G.

The ground electrode 40' is disposed on the inside of the upper surface 10a of the housing 10" spaced apart by a predetermined distance from the opposite surface of the printed circuit board 30 opposite to the plurality of carbon fiber electrodes 20 provided on one surface of the printed circuit board 30. The ground electrode 40' may be formed of a thin conductive metal plate and may have a length corresponding to the length of the printed circuit board 30 so that the plurality of carbon fiber electrodes 20 maintain a predetermined potential difference, respectively.

Figure 12:
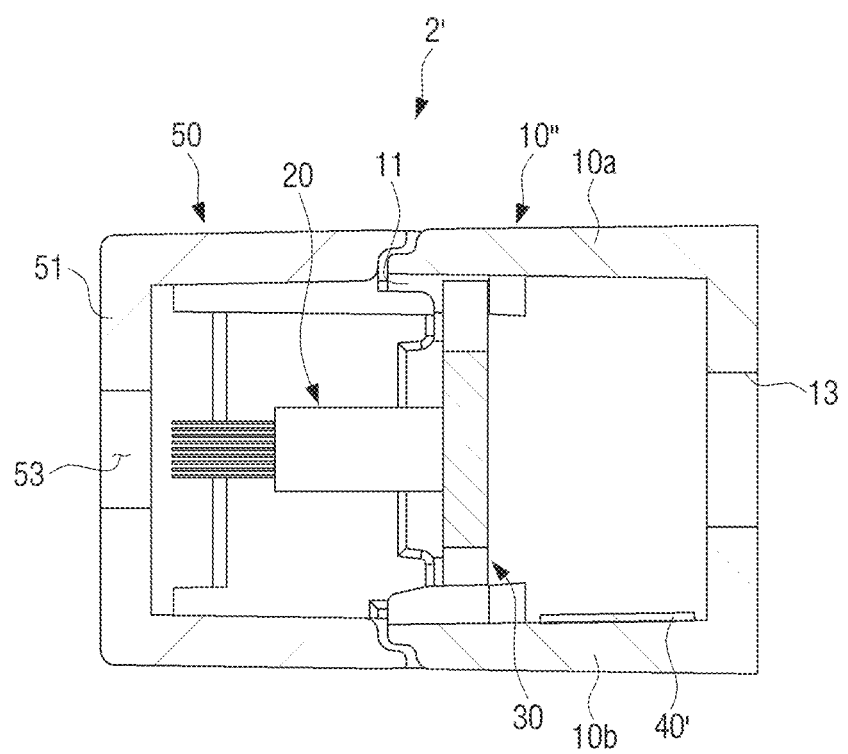
FIG. 12 is a cross-sectional view illustrating an example of a charging device of an electrostatic dust collecting device using carbon fibers according to an embodiment of the present disclosure.

FIG. 12 is a cross-sectional view illustrating an example of a charging device of an electrostatic dust collecting device using carbon fibers according to an embodiment of the present disclosure.

Referring to FIG. 12, a charging device 2' of an electrostatic dust collecting device according to an embodiment of the present disclosure may include a housing 10", a plurality of carbon fiber electrodes 20, a printed circuit board 30, and a ground electrode 40'.

The charging device 2' illustrated in FIG. 12 is the same as the charging device 2 illustrated in FIG. 11 described above, except that the ground electrode 40' is provided on the inner surface of the lower surface 10b of the housing 10"; therefore, the detailed description thereof is omitted.

Figure 13:
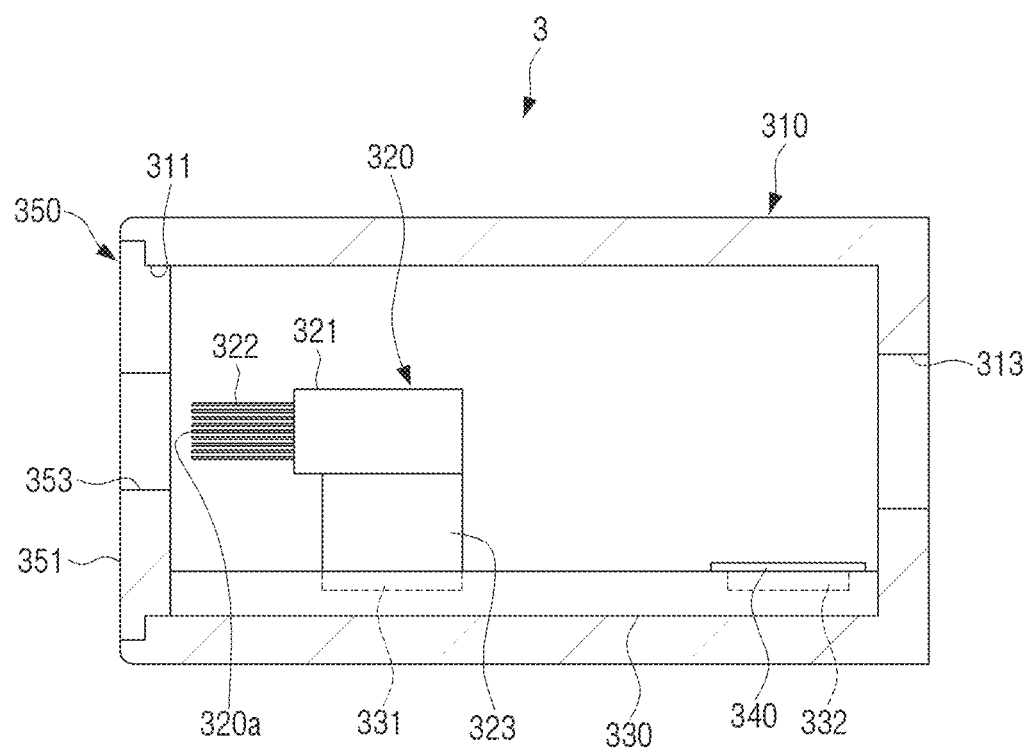
FIG. 13 is a cross-sectional view illustrating an example of a charging device of an electrostatic dust collecting device using carbon fibers according to an embodiment of the present disclosure.

FIG. 13 is a cross-sectional view illustrating an example of a charging device of an electrostatic dust collecting device using carbon fibers according to an embodiment of the present disclosure.

Referring to FIG. 13, a charging device 3 of an electrostatic dust collecting device according to an embodiment of the present disclosure may include a housing 310, a plurality of carbon fiber electrodes 320, a printed circuit board 330, and a ground electrode 340.

The housing 310 is formed in a substantially hollow rectangular parallelepiped shape having a long length and an opening 311 through which the plurality of carbon fiber electrodes 320 are exposed is provided on the front surface of the housing 310. The front end of the housing 310 is formed to be higher than the tips of the plurality of carbon fiber electrodes 320. Therefore, in FIG. 13, the tips 320a of the plurality of carbon fiber electrodes 320 are positioned behind the opening 311 of the housing 310. In addition, the rear surface of the housing 310 is provided with a rear opening 313 through which air is passed.

The plurality of carbon fiber electrodes 320 are disposed on the printed circuit board 330 such that the tips 320a thereof face the opening 311 of the housing 310. The plurality of carbon fiber electrodes 320 are disposed on the printed circuit board 330 to form a straight line at regular intervals. Further, the plurality of carbon fiber electrodes 320 are provided on the printed circuit board 330 such that the tips 320a thereof are positioned on the same plane.

The plurality of carbon fiber electrodes 320 are disposed parallel to the printed circuit board 330. In other words, a plurality of carbon fibers 322 and an electrode bar 321 forming the carbon fiber electrode 320 are provided in parallel to the printed circuit board 330. Therefore, the electrode bar 321 to which the plurality of carbon fibers 322 are fixed is fixed to the printed circuit board 330 by a support protrusion 323. Accordingly, the power supplied to the printed circuit board 330 is applied to the plurality of carbon fibers 322 through the support protrusion 323 and the electrode bar 321.

The ground electrode 340 is provided at a side of the plurality of carbon fiber electrodes 320 on the printed circuit board 330. Accordingly, the printed circuit board 330 is provided with a power supply line 331 for supplying power to the plurality of carbon fiber electrodes 320 and a ground line 332 to which the ground electrode 340 is connected. The ground electrode 340 is provided on the opposite side of the plurality of carbon fibers 322 based on the electrode bars 321 of the plurality of carbon fiber electrodes 320. In other words, the plurality of carbon fiber electrodes 320 are disposed on the printed circuit board 330 so as to face the opening 311 of the housing 310, and the ground electrode 340 is disposed on the printed circuit board 330 so as to be adjacent to the rear opening 313 of the housing 310.

Further, the ground electrode 340 is formed of a conductive thin metal plate. The ground electrode 340 may be formed to have a length corresponding to the length of the printed circuit board 330 so that the plurality of carbon fiber electrodes 320 fixed to the printed circuit board 330 may maintain a predetermined potential difference, respectively.

On the other hand, the printed circuit board 330 is fixed to the lower surface of the housing 310 with reference to FIG. 13. Accordingly, the printed circuit board 330 does not prevent air from flowing through the opening 311 and the rear opening 313 of the housing 310.

In addition, a protection grille 350 is disposed in the opening 311 of the front surface of the housing 310 to prevent electric shock. The protection grille 350 may be formed to have holes 353 that may block the user's hand or finger and through which air can pass.

The protection grille 350 is formed in a flat plate shape and is disposed in the opening 311 of the housing 310 so as to cover the opening 311 of the front surface of the housing 310. The rear surface of the protection grille 350 is spaced apart by a certain distance from the tips 320a of the plurality of carbon fiber electrodes 320. The protection grille 350 is provided with various pattern portions 351 forming a plurality of holes 353 that prevent the user's hand or finger from contacting the plurality of carbon fiber electrodes 320 and through which the air may be introduced. For example, the protection grille 350 may be formed in various patterns as illustrated in FIGS. 9A to 9G.

Hereinafter, a case where the electrostatic dust collecting device using carbon fibers according to an embodiment of the present disclosure as described above is applied to an indoor part of an air conditioner will be described in detail with reference to FIGS. 14 and 15.

Figure 14:
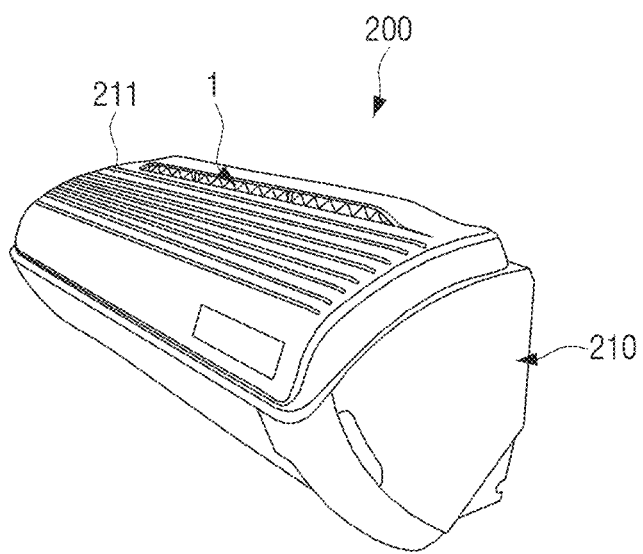
FIG. 14 is a perspective view illustrating an indoor part of an air conditioner having an electrostatic dust collecting device using carbon fibers according to an embodiment of the present disclosure.
Figure 15:
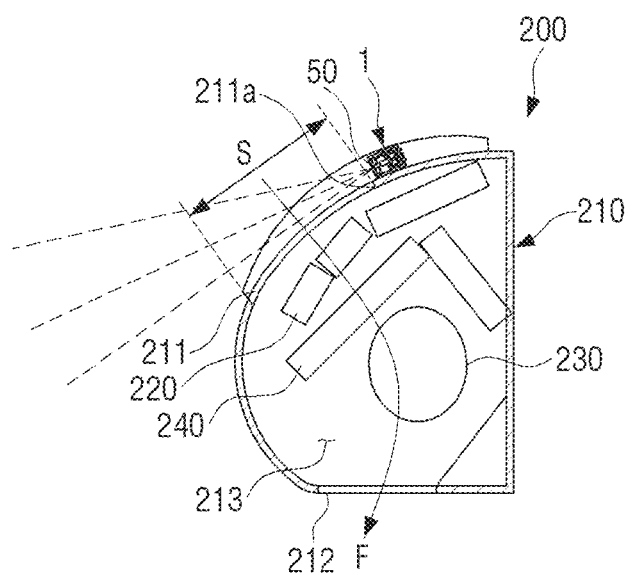
FIG. 15 is a cross-sectional view illustrating the indoor part of the air conditioner of FIG. 14.

FIG. 14 is a perspective view illustrating an indoor part of an air conditioner having an electrostatic dust collecting device using carbon fibers according to an embodiment of the present disclosure, and FIG. 15 is a cross-sectional view illustrating the indoor part of the air conditioner of FIG. 14.

Referring to FIGS. 14 and 15, an indoor part 200 of an air conditioner having the electrostatic dust collecting device using carbon fibers according to an embodiment of the present disclosure may include a case 210, a charging device 1, a dust collecting device 220, a heat exchanger 240, and a blowing fan 230.

The case 210 forms the appearance of the indoor part 200 of the air conditioner. The case 210 includes an inlet 211 through which outside air is introduced and an outlet 212 through which the air, which exchanged heat with the heat exchanger 240, is exhausted. The case 210 is provided with an air passage 213 that allows the inlet 211 and the outlet 212 to be communicated with each other and through which the sucked outside air passes.

The charging device 1 is disposed on the outer surface of the case 210 so as to be adjacent to the inlet 211. The charging device 1 is configured to charge contaminants such as dust contained in the air flowing into the inlet 211 by using carbon fibers. The charging device 1 may be disposed on the outer surface of the case 210 at a position where the charging device 1 does not interfere with the projection area S of the inlet 211, that is, at the edge of the inlet 211. For example, as illustrated in FIG. 15, the charging device 1 may be disposed so that the protection grille 50 of the charging device 1 does not extend beyond the one end 211a of the inlet 211 of the case 210. In other words, one end of the charging device 1 may be coincided with one end 211a of the inlet 211 of the case 210 or may be spaced apart from the one end 211a of the inlet 211 by a certain distance.

When the charging device 1 is disposed outside the inlet 211 so that the charging device 1 does not block the inlet as described above, the amount of air sucked into the inlet 211 is not reduced. Therefore, the cooling and heating efficiency of the indoor part 200 may be prevented from being reduced by the charging device 1 according to an embodiment of the present disclosure.

The charging device 1 may include a printed circuit board 30 on which the plurality of carbon fiber electrodes 20 are disposed, a housing 10 in which the plurality of carbon fiber electrodes 20 and the printed circuit board 30 are accommodated, a protection grille 50 that is provided in the opening 11 of the housing 10 and prevents the user from contacting the tips of the plurality of carbon fiber electrodes 20, and a ground electrode 40 provided in the housing 10. Such a charging device 1 is the same as the charging device 1 described above; therefore, detailed description thereof is omitted.

The dust collecting device 220 is provided in the air passage 213 inside the case 210 and is configured to collect contaminants charged by the charging device 1 from the air sucked by the blowing fan 230. The dust collecting device 220 may include, for example, a plurality of dust collecting plates spaced apart from each other by a predetermined distance and a dust collecting voltage applier configured to apply a high voltage to the plurality of dust collecting plates. When a high voltage is applied to the plurality of dust collecting plates by the dust collecting voltage applier, contaminants charged in combination with electrons generated by the charging device 1 may be collected in the plurality of dust collecting plates.

The heat exchanger 240 adjusts the temperature of the air by performing heat exchange with the air sucked by the blowing fan 230. For example, when the indoor part 200 of the air conditioner cools the room, the heat exchanger 240 cools the air sucked by the blowing fan 230 to lower the temperature of the air. In addition, when the indoor part 200 of the air conditioner heats the room, the heat exchanger 240 heats the air sucked by the blowing fan 230 to increase the temperature of the air. The heat exchanger 240 is the same as or similar to the heat exchanger used in the indoor part of the conventional air conditioner; therefore, a detailed description thereof is omitted.

The blowing fan 230 is disposed inside the case 210, and is configured so that outside air is sucked through the inlet 211, passes through the heat exchanger 240, and then is exhausted to the outside of the case 210 through the outlet 212. In other words, when the blowing fan 230 is operated, air containing contaminants is introduced into the inlet 111 of the case 210, and the introduced air passes through the dust collecting device 220 and the heat exchanger 240 along the air passage 213, and then exhausted through the outlet 112. Because the blowing fan 230 generates a suction force capable of sucking outside air, the blowing fan 230 may function as an air moving device of the electrostatic dust collecting device according to an embodiment of the present disclosure.

An operation of the indoor part 200 of the air conditioner having the above-described structure will be described with reference to FIGS. 14 and 15.

When the indoor part 200 is operated, a high voltage is applied from the high voltage applying part 60 (see FIG. 2) to the charging device 1 provided on the outer surface of the case 210 adjacent to the inlet 211. When a high voltage is applied to the charging device 1, electrons are emitted from the plurality of carbon fiber electrodes 20 of the charging device 1. Electrons emitted from the charging device 1 combine with contaminants in the air stream flowing into the inlet 211, thereby charging the contaminants.

In addition, when the indoor part 200 is operated, the blowing fan 230 is operated so that the outside air F is introduced into the case 210 through the inlet 211. At this time, the contaminants contained in the outside air flow F introduced into the inlet 211 are charged by the charging device 1.

While the introduced outside air passes through the dust collecting device 220, the charged contaminants are collected by the dust collecting device 220, and then the cleaned air moves to the heat exchanger 240.

The air cleaned by the dust collecting device 220 exchanges heat with the refrigerant of the heat exchanger 240 while passing through the heat exchanger 240, so that the temperature of the air is adjusted.

The temperature-adjusted air passes through the blowing fan 230 and is exhausted to the outside of the indoor part 200 through the outlet 212 of the case 210.

As described above, the indoor part 200 of the air conditioner equipped with the electrostatic dust collecting device using carbon fibers according to an embodiment of the present disclosure may remove contaminants form sucked air and adjust the temperature of the air.

Hereinafter, an electrical appliance having an electrostatic dust collecting device using carbon fibers according to an embodiment of the present disclosure will be described with reference to FIG. 16.

Figure 16:
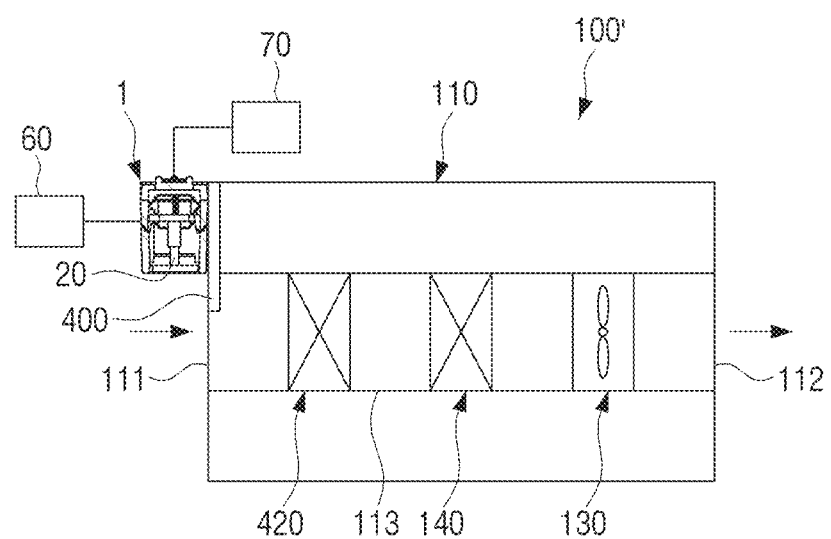
FIG. 16 is a conceptual view illustrating an electrical appliance including an electrostatic dust collecting device using carbon fibers according to an embodiment of the present disclosure.

FIG. 16 is a conceptual view illustrating an electrical appliance including an electrostatic dust collecting device using carbon fibers according to an embodiment of the present disclosure.

Referring to FIG. 16, an electrical appliance 100' having an electrostatic dust collecting device using carbon fibers according to an embodiment of the present disclosure may include a main body 110, a charging device 1, an air moving device 130, a dust collecting device 420, and a plurality of electron blocking plates 400.

The main body 110 forms an outer shape of the electrical appliance 100' and may have various shapes depending on the type of the electrical appliance 100'. The electrical appliance 100' may be any one of an air purifier, an air conditioner, a dehumidifier, a humidifier, a clothes manager, a refrigerator, a dryer, and the like. The main body 110 may be provided with an inlet 111 through which outside air is sucked, an outlet 112 through which the sucked air is exhausted, and an air passage 113 connecting the inlet 111 and the outlet 112.

The charging device 1 is provided near the inlet 111 of the main body 110 and is configured to charge contaminants such as dust contained in the air sucked into the inlet 111 by using carbon fibers. The charging device 1 may be disposed on the outer surface of the main body 110 at the edge of the inlet 111. In other words, the charging device 1 may be disposed on the outer surface of the main body 110 so as not to interfere with the projection area of the inlet 111. When the charging device 1 is provided outside the inlet 111 so that the charging device 1 does not block the inlet 111, the amount of air sucked into the inlet 111 is not reduced. The configuration of the charging device 1 will be described in detail below.

The air moving device 130 is disposed inside the main body 110 and is configured to suck outside air containing contaminants through the inlet 111 and to exhaust the outside air to the outside of the main body 110. In other words, when the air moving device 130 operates, air containing contaminants is introduced into the inlet 111 of the main body 110, flows along the air passage 113, and is exhausted through the outlet 112. A fan capable of generating a suction force capable of sucking air may be used as the air moving device 130.

The dust collecting device 420 is disposed in the air passage 113 provided inside the main body 110 and is configured to collect the contaminants charged by the charging device 1 from the air sucked by the air moving device 130. An example of the dust collecting device 420 is illustrated in FIG. 17.

Figure 17:
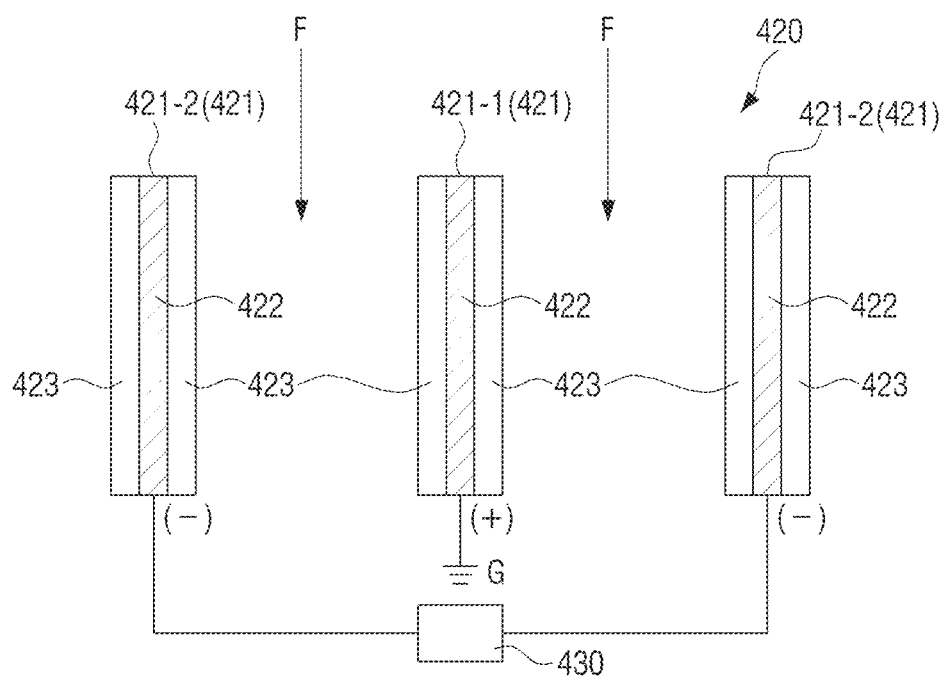
FIG. 17 is a cross-sectional view conceptually illustrating an example of a dust collecting device used in the electrical appliance of FIG. 16.

FIG. 17 is a cross-sectional view conceptually illustrating an example of a dust collecting device used in the electrical appliance of FIG. 16.

Referring to FIG. 17, the dust collecting device 420 may include a plurality of dust collecting plates 421 spaced apart from each other by a predetermined distance and a dust collecting voltage applier 430 configured to apply a high voltage to the plurality of dust collecting plates 421.

The dust collecting plate 421 may include an electrode 422 and insulating layers 423 laminated on the both side surfaces of the electrode 422. In other words, the dust collecting plate 421 may be laminated in the order of the insulating layer 423, the electrode 422, and the insulating layer 423. For example, the electrode 422 may be formed of a carbon electrode, and the insulating layers 423 may be formed of polyethylene terephthalate (PET) film on both side surfaces of the electrode 422. However, the kind of electrode 422 and the insulating layers 423 constituting the dust collecting plates 421 is not limited thereto. The electrode 422 and the insulating layers 423 of the dust collecting plates 421 may be configured in various kinds as long as a high voltage can be applied.

When a high voltage is applied to the plurality of dust collecting plates 421 from the dust collecting voltage applier 430, contaminants that are charged by being combined with the electrons generated in the charging device 1 and become ions may be collected in the plurality of dust collecting plates 421. For example, in FIG. 17, the central dust collecting plate 421-1 is connected to the ground G, and a negative high voltage is applied to both side dust collecting plates 421-2. Thus, the contaminants that become negative ions by being combined with electrons emitted from the carbon fiber electrodes 20 adhere to the surface of the central dust collecting plate 421-1. Therefore, because the contaminants contained in the sucked outside air are removed by the dust collecting device 420, the cleaned air is discharged from the dust collecting device 420.

However, when the insulating layers 423 are formed on both side surfaces of the electrode 422 of the dust collecting plate 421 as described above, electrons generated from the carbon fiber electrodes 20 may not combine with contaminants such as dust, but directly adhere to the surface of the insulating layers 423. When the electrons that are not combined with the contaminants adhere to the insulating layers 423, the electrons attached to the insulating layers 423 prevent the ionized contaminants which are combined with other electrons from attaching to the insulating layers 423, thereby decreasing the ability of the dust collecting device 420 to collect the contaminants. However, such a problem may not occur when the dust collecting plate does not include an insulating layer like the dust collecting device 120 of the above-described embodiment.

A plurality of electron blocking plates 400 may be provided between the charging device 1 and the dust collecting device 420. The plurality of electron blocking plates 400 are configured to block electrons emitted from the plurality of carbon fiber electrodes 20 of the charging device 1 from flowing to the dust collecting device 420. The plurality of electron blocking plates 400 may be provided to have a one-to-one correspondence with the plurality of carbon fiber electrodes 20 of the charging device 1. The plurality of electron blocking plates 400 will be described in detail below.

The main body 110 may further include a processing part 140 that performs a predetermined process on the sucked air. For example, when the electrical appliance 100' is implemented as an air conditioner, the main body 110 may be provided with a heat exchanger capable of performing heat exchange with the sucked air as the processing part 140. When the electrical appliance 100' is a dehumidifier, the main body 110 may be provided with a dehumidifying device capable of removing moisture from the sucked air as the processing part 140. In addition, when the electrical appliance 100' is a humidifier, the main body 110 may be provided with a humidifying device capable of adding moisture to the sucked air as the processing part 140.

In the case where the electrical appliance 100' is an air cleaner implemented by an electrostatic dust collecting device according to an embodiment of the present disclosure, the processing part 140 may not exist in the main body 110.

In addition, when the electrical appliance 100' is a clothes manager, a refrigerator, a dryer, or the like, to which the electrostatic dust collecting device according to an embodiment of the present disclosure is additionally provided, the processing part 140 may not be included inside the main body 110.

Hereinafter, the charging device 1 used in the electrostatic dust collecting device using carbon fibers according to an embodiment of the present disclosure will be described in detail with reference to FIGS. 18 and 19.

Figure 18:
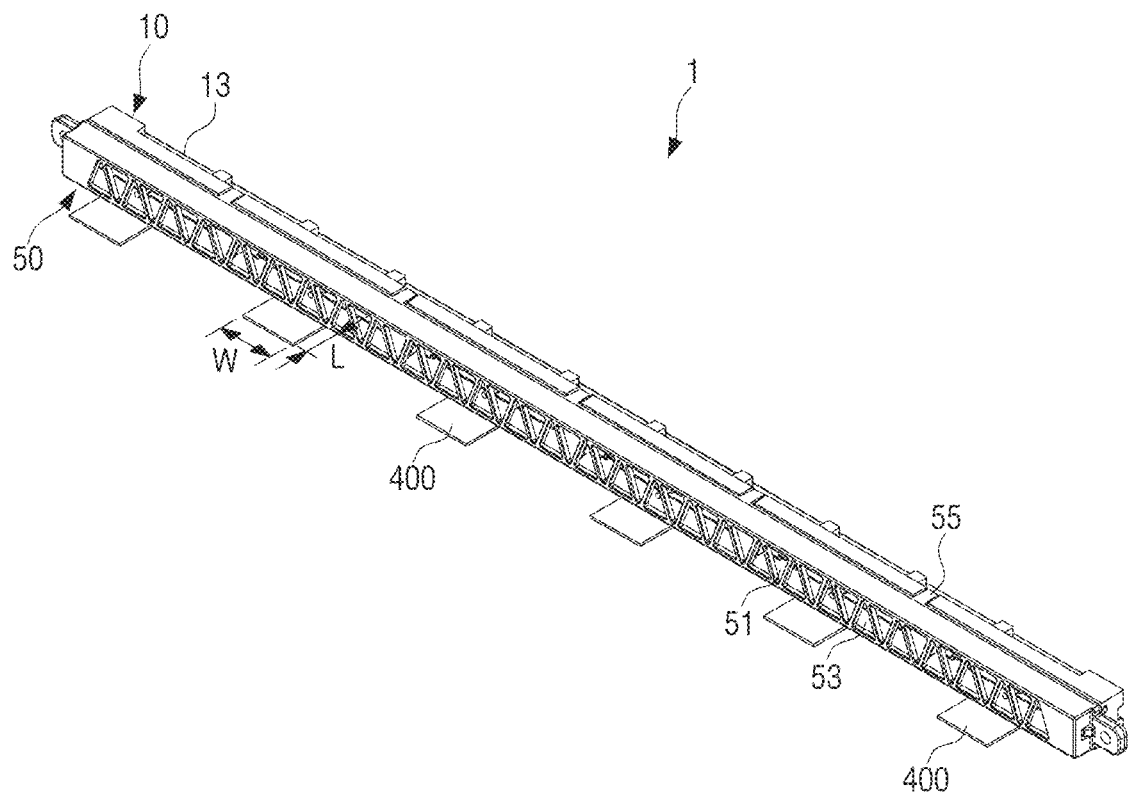
FIG. 18 is a perspective view illustrating a charging device of an electrostatic dust collecting device using carbon fibers according to an embodiment of the present disclosure having a plurality of electron blocking plates.

FIG. 18 is a perspective view illustrating a charging device of an electrostatic dust collecting device using carbon fibers according to an embodiment of the present disclosure having a plurality of electron blocking plates. FIG. 19 is an exploded perspective view illustrating a charging device and a charging device holder of an electrostatic dust collecting device using carbon fibers according to an embodiment of the present disclosure having a plurality of electron blocking plates.

Figure 19:
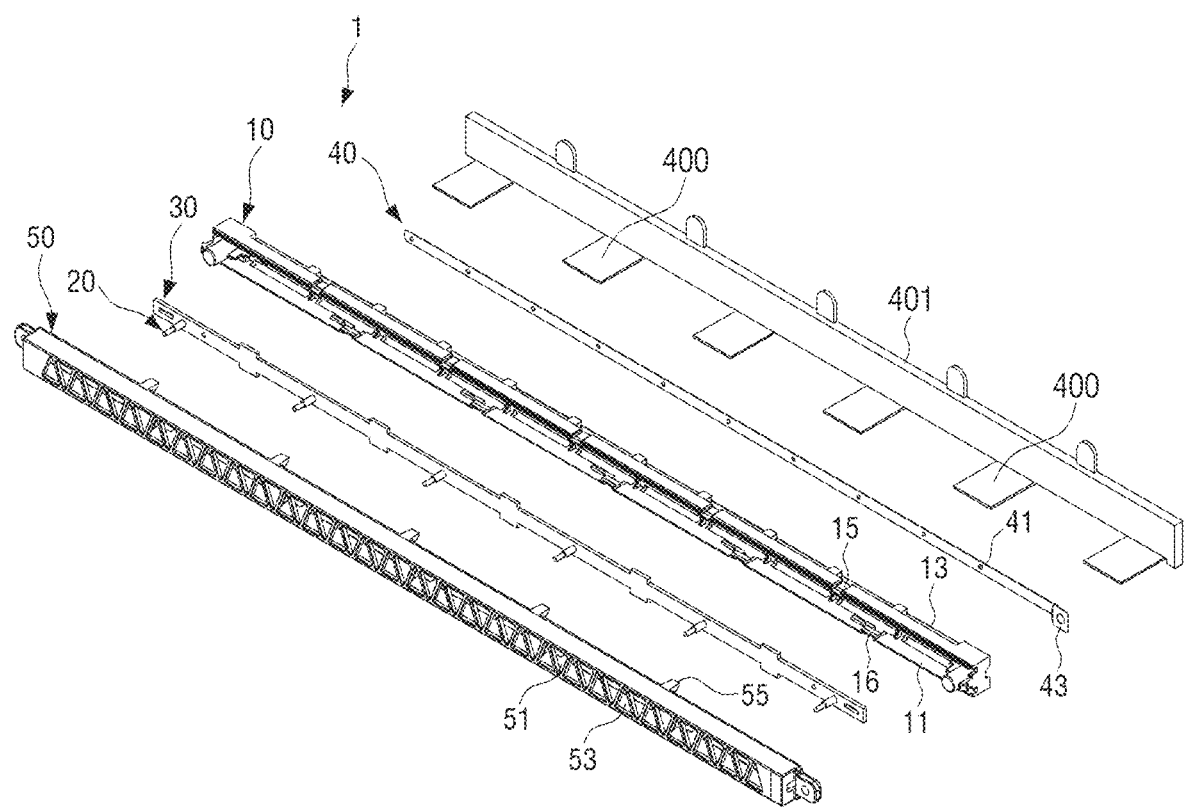
FIG. 19 is an exploded perspective view illustrating a charging device and a charging device holder of an electrostatic dust collecting device using carbon fibers according to an embodiment of the present disclosure having a plurality of electron blocking plates.

Referring to FIGS. 18 and 19, the charging device 1 of an electrostatic dust collecting device using carbon fibers according to an embodiment of the present disclosure may include a housing 10, a plurality of carbon fiber electrodes 20, a printed circuit board 30, and a ground electrode 40.

The housing 10 is formed to accommodate the plurality of carbon fiber electrodes 20 and the printed circuit board 30. An opening 11 may be formed on one surface of the housing 10 facing the tips of the plurality of carbon fiber electrodes 20, that is, on the front surface of the housing 10. A rear opening 13 may be provided on the opposite side of the one surface of the housing 10, that is, on the rear surface of the housing 10. The plurality of carbon fiber electrodes 20 may be exposed through the opening 11 of the housing 10. Therefore, the housing 10 is formed so that the air can flow through the inside of the housing 10.

In the case of the present embodiment, as illustrated in FIG. 19, the housing 10 is formed in a substantially hollow rectangular parallelepiped shape having a long length. The printed circuit board 30 to which the plurality of carbon fiber electrodes 20 are fixed is provided inside the housing 10.

The plurality of carbon fiber electrodes 20 are formed to generate electrons from the tips of the carbon fiber electrodes 20 when a high voltage is applied thereto. The plurality of carbon fiber electrodes 20 are disposed such that the tips of the carbon fiber electrodes 20 face the opening 11 of the housing 10. Therefore, electrons generated from the plurality of carbon fiber electrodes 20 are emitted to the outside through the opening 11 of the housing 10. When the charging device 1 is disposed in the electrical appliance 100' such that the opening 11 of the housing 10 faces the inlet 111 of the main body 110 as illustrated in FIG. 16, the tips of the plurality of carbon fiber electrodes 20 are arranged to face the inlet 111. Accordingly, because electrons generated from the plurality of carbon fiber electrodes 20 are emitted to the outside through the opening 11 of the housing 10, contaminants contained in the air introduced into the inlet 111 may be charged.

The plurality of carbon fiber electrodes 20 are provided on the printed circuit board 30 at regular intervals. The plurality of carbon fiber electrodes 20 are arranged on the printed circuit board 30 in a straight line. In addition, the plurality of carbon fiber electrodes 20 are disposed on the printed circuit board 30 at the same height.

The printed circuit board 30 is provided with a power supply line 31 capable of applying power to the plurality of carbon fiber electrodes 20. A high voltage applying part 60 is connected to the power supply line 31 of the printed circuit board 30. Therefore, a high voltage may be applied to the plurality of carbon fiber electrodes 20 through the power supply line 31 of the printed circuit board 30. For example, the high voltage applying part 60 may be configured to apply a voltage of about 6 kV to the plurality of carbon fiber electrodes 20 through the power supply line 31 of the printed circuit board 30.

The printed circuit board 30 may be provided with a plurality of holes through which the air drawn into housing 10 passes. A plurality of notched portions 33 through which air passes may be provided on both side surfaces of the printed circuit board 30 (see FIG. 7). Therefore, the plurality of notched portions 33 of the printed circuit board 30 performs the function of a plurality of holes through which the air passes. The printed circuit board 30 is formed in a rectangular plate corresponding to the opening 11 of the housing 10 so that the printed circuit board 30 may be inserted into the housing 10. The plurality of notched portions 33 having a predetermined depth are formed on both side surfaces of the printed circuit board 30. Thus, the air introduced into the housing 10 may flow through the plurality of notched portions 33 of the printed circuit board 30.

In addition, the printed circuit board 30 is supported by a plurality of supporting portions 16 provided inside the housing 10. The plurality of supporting portions 16 may be provided on the inner surfaces of the upper surface and the lower surface of the housing 10 so as to support the printed circuit board 30. In addition, a center supporting portion 17 may be provided on the inner surface of each of both ends of the housing 10 to support the both ends of the printed circuit board 30.

The plurality of carbon fiber electrodes 20 may include an appropriate number of carbon fiber electrodes 20 to emit electrons to all the air sucked into the inlet 111 of the main body 110. In the embodiment shown in FIG. 19, six carbon fiber electrodes 20 are provided on the printed circuit board 30, but this is merely an example. The number of the plurality of carbon fiber electrodes 20 and the distance between the two adjacent carbon fiber electrodes 20 may be appropriately determined depending on the size of the inlet 111 of the main body 110 in which the charging device 1 is disposed.

In addition, the printed circuit board 30 is formed to have a length capable of supporting the plurality of carbon fiber electrodes 20 arranged in a single line. For example, the printed circuit board 30 on which the plurality of carbon fiber electrodes 20 are disposed may be formed to have a length equal to or greater than ⅓ of the length of the inlet 111 of the main body 110.

Each of the plurality of carbon fiber electrodes 20 may include an electrode bar 21 fixed to the printed circuit board 30 and a plurality of carbon fibers 22 disposed at the tip of the electrode bar 21.

The electrode bar 21 may be formed in a substantially cylindrical shape so as to support the plurality of carbon fibers 22 and fix them to the printed circuit board 30. In other words, one end of the electrode bar 21 is fixed to the printed circuit board 30, and the plurality of carbon fibers 22 are disposed at the other end of the electrode bar 21. Further, the electrode bar 21 is electrically connected to the power supply line 31 of the printed circuit board 30. The electrode bar 21 may be formed of a conductive material to apply power to the plurality of carbon fibers 22.

In the present embodiment, the electrode bar 21 is formed in a cylindrical shape having a circular cross-section. However, the shape of the electrode bar 21 is not limited thereto. The electrode bar 21 may be formed in various shapes as long as the electrode bar 21 can fix the plurality of carbon fibers 22 to the printed circuit board 30. As an example, the electrode bar 21 may be formed in a columnar shape having a cross-section of a polygonal shape such as a quadrangle, a pentagon, and the like, or an elliptical shape.

The plurality of carbon fibers 22 are fixed to one end of the electrode bar 21 in the form of a bundle. In other words, the plurality of carbon fibers 22 may have a brush shape. The plurality of carbon fibers 22 are spaced apart from each other so as not to contact each other. Each of the plurality of carbon fibers 22 may be formed to have a diameter of about 6 μm to about 8 μm.

Therefore, when a negative (−) high voltage is applied to the printed circuit board 30, electrons e− are emitted from the tip ends of the plurality of carbon fibers 22 and charge the contaminants contained in the air. In other words, the electrons e− emitted from the tips of the plurality of carbon fibers 22 are combined with the contaminants c to charge the contaminants to become anions c−(e−+c=c−).

The ground electrode 40 maintains a predetermined potential difference between each of the plurality of carbon fiber electrodes 20 and the surrounding air, so that a predetermined amount of electrons is generated from the plurality of carbon fiber electrodes 20 even after a lapse of time. For this purpose, the ground electrode 40 is disposed around the plurality of carbon fiber electrodes 20. For example, the ground electrode 40 may be disposed in the vicinity of the printed circuit board 30 so as not to face the tips of the plurality of carbon fiber electrodes 20. In other words, the ground electrode 40 may be disposed behind the printed circuit board 30 opposite to one surface of the printed circuit board 30 on which the plurality of carbon fiber electrodes 20 are provided or the plurality of carbon fiber electrodes 20.

For example, the ground electrode 40 may be disposed on the rear surface of the housing 10 (see FIGS. 5 and 6). To this end, an electrode fixing portion 18 to which the ground electrode 40 is fixed may be provided on the rear surface of the housing 10. Thus, the ground electrode 40 may be disposed on the rear surface of the housing 10 spaced apart by a predetermined distance from the opposite surface of the printed circuit board 30 opposite to the plurality of carbon fiber electrodes 20 provided on one surface of the printed circuit board 30. At this time, the rear opening 13 of the housing 10 may be provided on the rear surface of the housing 10 at both sides of the ground electrode 40.

The ground electrode 40 is formed of a conductive thin metal plate and is formed to have a length corresponding to the length of the printed circuit board 30 so that all of the plurality of carbon fiber electrodes 20 may maintain a predetermined potential difference. As illustrated in FIG. 19, in the case of the present embodiment, the ground electrode 40 is formed of a thin strip-shaped metal plate.

In addition, the ground electrode 40 may include a plurality of through holes 41. A plurality of fixing pins 18a (see FIG. 5) corresponding to the plurality of through holes 41 of the ground electrode 40 are provided in the electrode fixing portion 18 (see FIG. 5) of the housing 10. Therefore, when the plurality of fixing pins 18a of the housing 10 are inserted into the plurality of through holes 41 of the ground electrode 40, the ground electrode 40 is fixed to the electrode fixing portion 18 of the housing 10.

The ground electrode 40 is connected to an external ground 70. For example, the ground electrode 40 may be connected to the external ground 70 by connecting a ground wire (not illustrated) connected to the ground 70 of an external power source to one end 43 of the ground electrode 40. As described above, when the ground electrode 40 is connected to the external ground 70, ions saturated in the periphery of the plurality of carbon fiber electrodes 20 are discharged to the external ground 70 through the ground electrode 40, so that the periphery of the ground electrode 40 may maintain a predetermined potential difference. Therefore, the plurality of carbon fiber electrodes 20 may always generate electrons stably regardless of the passage of time.

In the case in which the plurality of carbon fiber electrodes 20 are exposed to the outside, when a user cleans the electrical appliance 100' equipped with the electrostatic dust collecting device using carbon fibers according to an embodiment of the present disclosure, a hand or a part of the body of the user may contact the plurality of carbon fiber electrodes 20. At this time, because a high voltage is applied to the plurality of carbon fiber electrodes 20, the user may be subjected to electric shock when the hand or a part of the body touches the carbon fiber electrodes 20.

A protection grille 50 may be disposed in the opening 11 of the front surface of the housing 10 facing the plurality of carbon fiber electrodes 20 in order to prevent the electric shock. The protection grille 50 blocks the user's hand or finger from contacting the carbon fiber electrodes 20. The protection grille 50 may be formed in various patterns that block the user's hand or finger and allow air and electrons generated from the plurality of carbon fiber electrodes 20 to pass through.

Referring to FIGS. 18 and 19, the protection grille 50 is formed in a substantially hollow rectangular parallelepiped shape having a long length. The front surface of the protection grille 50 is provided with a pattern portion 51 through which air may be drawn and electrons may be emitted. The rear surface of the protection grille 50 coupled to the housing 10 is open.

A plurality of fixing protrusions for fixing the printed circuit board 30 to the housing 10 may be provided at a rear end of the protection grille 50. When the protection grille 50 is coupled to the opening 11 of the housing 10, the pattern portion 51 of the protection grille 50 is spaced apart by a predetermined distance from the tips of the plurality of carbon fiber electrodes 20 and the printed circuit board 30 is fixed to the inside of the housing 10. Therefore, there is a certain gap between the inner surface of the front surface of the protection grille 50 and the tips of the plurality of carbon fiber electrodes 20 fixed to the housing 10.

In addition, a plurality of fixing hooks 55 for coupling the protection grille 50 to the housing 10 may be provided on the upper surface and the lower surface of the rear end of the protection grille 50. A plurality of fixing grooves 15 to which the plurality of fixing hooks 55 of the protection grille 50 are coupled may be provided on the upper surface and the lower surface of the front end of the housing 10 corresponding thereto.

On the other hand, the pattern portion 51 of the protection grille 50 may be formed in various patterns having holes 53 that block the user's hand or finger and through which air and electrons may pass. For example, the pattern portion 51 of the protection grille 50 may be formed in various patterns as illustrated in FIGS. 9A to 9G described above.

Such a charging device 1 may be supported by a charging device holder 401. Because the charging device holder 401 is disposed near the inlet 111 of the main body 110, the charging device 1 is fixed to the main body 110 by the charging device holder 401.

The plurality of electron blocking plates 400 are disposed between the charging device 1 and the dust collecting device 420 and may prevent electrons generated in the charging device 1 from directly attaching to the dust collecting plates 421 of the dust collecting device 420. For example, the electron blocking plates 400 are disposed above the dust collecting device 420 under the carbon fiber electrodes 20 of the charging device 1 so as to prevent electrons emitted from the carbon fiber electrodes 20 from directly attaching to the dust collecting plates 421 of the dust collecting device 420 without being combined with contaminants such as dust. At this time, some of electrons are combined with fine particles existing between the carbon fiber electrodes 20 and the dust collecting device 420, which are not contaminants such as dust, to become fine particle anions, and the fine particle anions may be attached to the dust collecting plates 421 of the dust collecting device 420. However, the electron blocking plates 400 may also block such a case.

When the electrons emitted from the carbon fiber electrodes 20 adhere to the surface of the grounded dust collecting plate 421-1 of the dust collecting device 420 without ionizing contaminants, the surface of the dust collecting plate 421-1 is saturated with the electrons and prevents the contaminants that become negative ions by being combined with electrons from adhering to the dust collecting plates 421-1. Thus, the dust collecting capability of the dust collecting device 420 may be lowered. In order to prevent deterioration of the dust collecting capability of the dust collecting device 420, the plurality of electron blocking plates 400 may be provided.

The plurality of electron blocking plates 400 may be formed of an electrical insulator through which electricity does not pass. For example, the plurality of electron blocking plates 400 may be formed of a material having a surface resistance of 108 Ω·cm.

The plurality of electron blocking plates 400 may be provided to extend toward the charging device 1 from the lower end of the charging device holder 401 as illustrated in FIG. 19. In other words, the plurality of electron blocking plates 400 may be formed at substantially right angles with respect to the charging device holder 401. Each of the plurality of electron blocking plates 400 may have a length so that when the charging device 1 is coupled to the charging device holder 401, a front portion of the electron blocking plate 400 protrudes a predetermined length L from the front surface of the charging device 1 as illustrated in FIG. 18.

The plurality of electron blocking plates 400 may be formed to be spaced apart at regular intervals in the longitudinal direction of the charging device holder 401. The plurality of electron blocking plates 400 may be formed to correspond one-to-one with the plurality of carbon fiber electrodes 20 of the charging device 1. For example, as illustrated in FIG. 19, when the charging device 1 includes six carbon fiber electrodes 20, six electron blocking plates 400 are also provided. The plurality of electron blocking plates 400 may be injection molded integrally with the charging device holder 401 when the charging device holder 401 is injection molded using plastic.

In FIG. 19, the plurality of electron blocking plates 400 are formed in the charging device holder 401. However, the place where the plurality of electron blocking plates 400 are formed is not limited thereto. As long as the plurality of electron blocking plates 400 may be positioned under the plurality of carbon fiber electrodes 20, the plurality of electron blocking plates 400 may be formed in various places. Hereinafter, cases in which the plurality of electron blocking plates 400 are provided in the protection grille 50 and the housing 10 will be described with reference to FIGS. 20 and 21.

Figure 20:
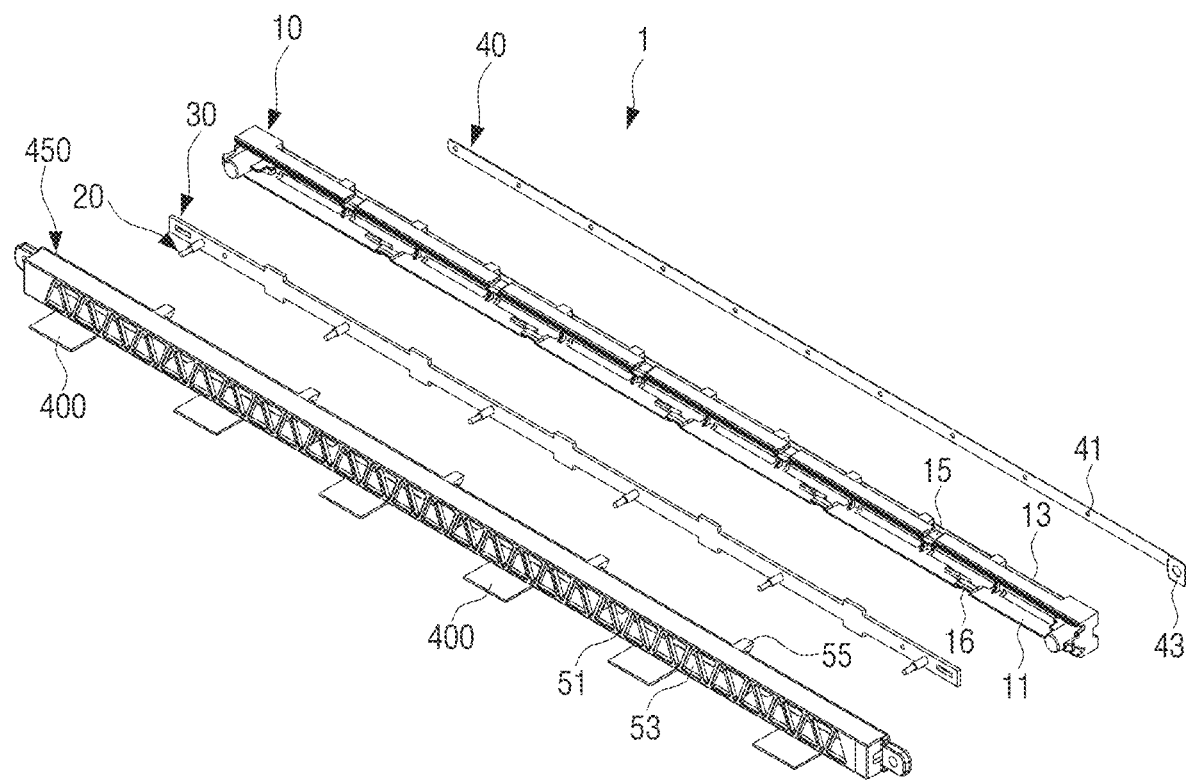
FIG. 20 is an exploded perspective view illustrating a charging device having a protection grille in which a plurality of electron blocking plates are provided.

FIG. 20 is an exploded perspective view illustrating a charging device in which a plurality of electron blocking plates are provided in a protection grille of the charging device.

Referring to FIG. 20, the plurality of electron blocking plates 400 may be formed in the protection grille 450. The plurality of electron blocking plates 400 may be formed to protrude forward from the lower end of the protection grille 450. The plurality of electron blocking plates 400 may be formed at substantially right angles with respect to the protection grille 450. The plurality of electron blocking plates 400 may be formed to be spaced apart at regular intervals in the longitudinal direction of the protection grille 450. The plurality of electron blocking plates 400 may be formed to correspond one-to-one with the plurality of carbon fiber electrodes 20 provided under the protection grille 450. The plurality of electron blocking plates 400 may be injection molded integrally with the protection grille 450 when the protection grille 450 is injection molded using plastic.

Figure 21:
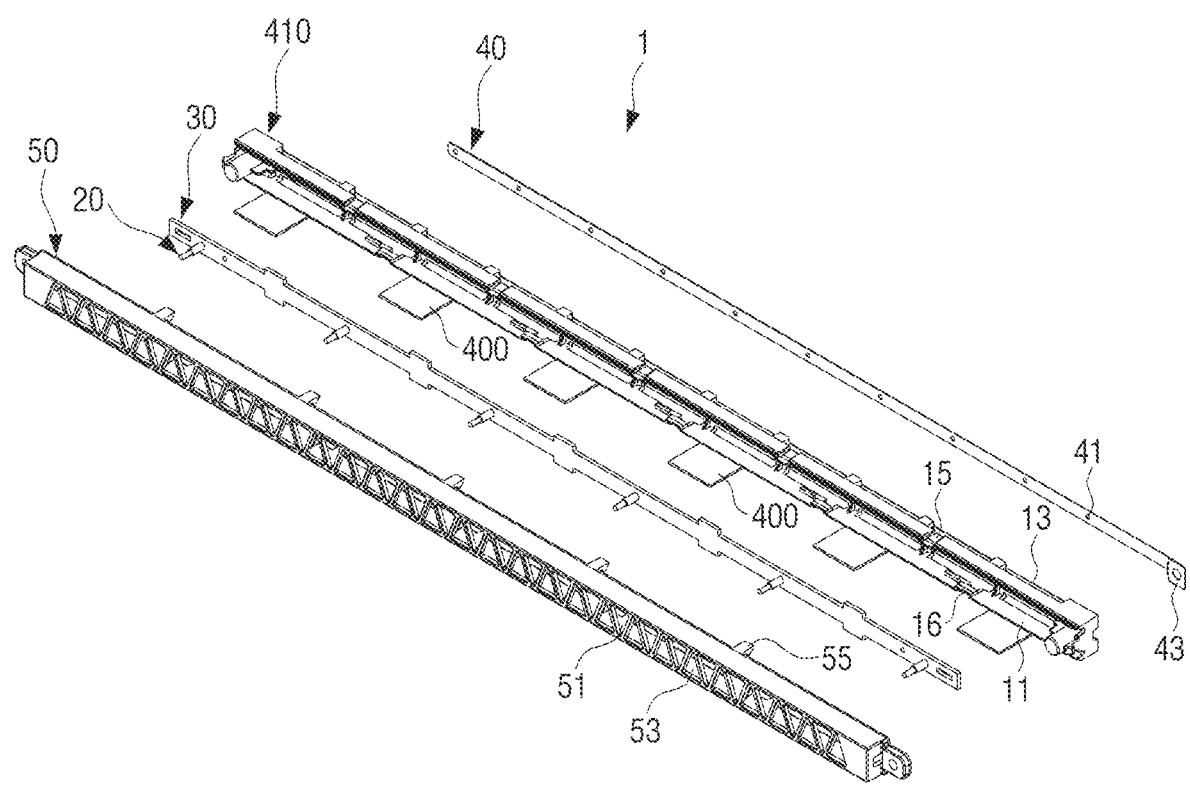
FIG. 21 is an exploded perspective view illustrating a charging device having a housing in which a plurality of electron blocking plates are provided.

FIG. 21 is an exploded perspective view illustrating a charging device in which a plurality of electron blocking plates are provided in a housing of the charging device.

Referring to FIG. 21, the plurality of electron blocking plates 400 may be formed in the housing 410. The plurality of electron blocking plates 400 may protrude from the lower end of the opening 11 of the housing 410 toward the protection grille 50. At this time, each of the plurality of electron blocking plates 400 may have a length so that when the protection grille 50 is coupled to the housing 410, a front portion of the electron blocking plate 400 protrudes a predetermined length L from the front surface of the protection grille 50 as illustrated in FIG. 18.

The plurality of electron blocking plates 400 may be formed at substantially right angles with respect to the housing 410. The plurality of electron blocking plates 400 may be formed to be spaced apart at regular intervals in the longitudinal direction of the housing 410. The plurality of electron blocking plates 400 may be formed to correspond one-to-one with the plurality of carbon fiber electrodes 20 provided inside the housing 410. The plurality of electron blocking plates 400 may be injection molded integrally with the housing 410 when the housing 410 is injection molded using plastic.

The electron blocking plates 400 may affect the amount of air introduced into the inlet 111. In detail, when the size of the electron blocking plate 400 is too large, the amount of air introduced into the inlet 111 may be reduced. Therefore, the size of the electron blocking plate 400 may be determined such that the number of electrons directly attached to the dust collecting plates 421 among the electrons emitted from the carbon fiber electrodes 20 can be minimized while minimizing the reduction of the amount of air introduced therein.

When the width W of the portion of the electron blocking plate 400 protruding from the front surface of the protection grille 50 is larger than the protruding length L thereof, the reduction of the amount of air may be minimized and the number of electrons directly attached to the dust collecting plates 421 among the electrons emitted from the carbon fiber electrodes 20 may be minimized. For example, in FIG. 18, the width W of the electron blocking plate 400 may be 16 mm, and the protruding length L thereof may be 10 mm. When the width W of the electron blocking plate 400 is made too large, the amount of air flowing into the inlet 111 decreases, thereby reducing the clean area that can be collected by the dust collecting device 420.

In addition, the installation position of the electron blocking plates 400 may affect that the electron blocking plates 400 block electrons emitted from the carbon fiber electrodes 20 from directly attaching to the dust collecting plates 421. Hereinafter, the positional relationship between the electron blocking plate 400, the carbon fiber electrode 20, and the dust collecting device 420 will be described with reference to FIG. 22.

Figure 22:
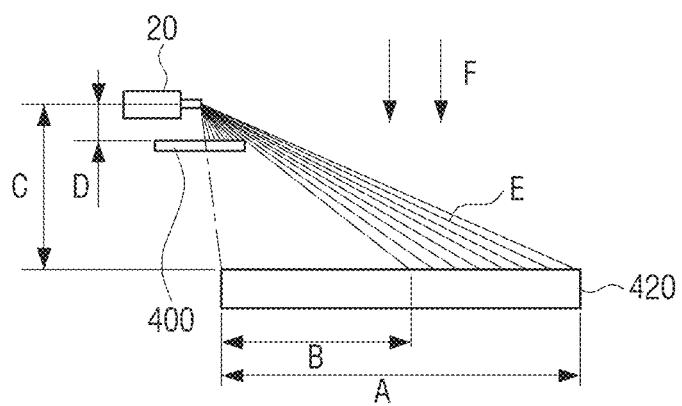
FIG. 22 is a conceptual view illustrating a state in which electrons emitted from a carbon fiber electrode are blocked by an electron blocking plate.
Figure 23:
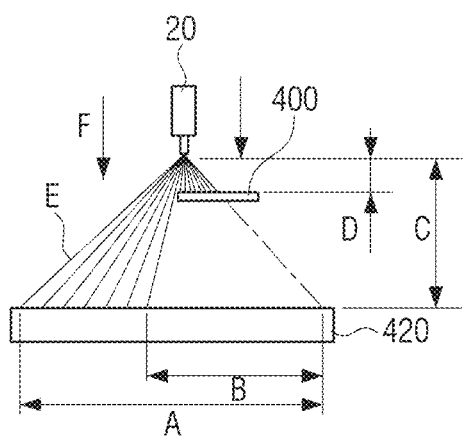
FIG. 23 is a conceptual view illustrating a state in which electrons emitted from a carbon fiber electrode are blocked by an electron blocking plate.

FIGS. 22 and 23 are a conceptual view illustrating a state in which electrons emitted from a carbon fiber electrode are blocked by an electron blocking plate.

Referring to FIG. 22, the carbon fiber electrode 20 is disposed substantially perpendicular to the flow direction F of the air flowing into the dust collecting device 420. The electron blocking plate 400 is disposed in substantially parallel with the dust collecting device 420 between the carbon fiber electrode 20 and the dust collecting device 420. Therefore, the electron blocking plate 400 may prevent electrons generated from the carbon fiber electrode 20 from being directly introduced into and attached to a predetermined region of the dust collecting device 420. At this time, the electron blocking plates 400 may be formed to prevent electrons from directly attaching to dust collecting device 420 in a region of ½ or more of the length of the dust collecting device 420. In this way, degradation of the dust collecting capability of the dust collecting device 420 caused by electrons directly attached to the dust collecting device 420 may be prevented or minimized.

In FIG. 22, the length of the dust collecting device 420 is A, the length of the portion of the dust collecting device 420 where electrons cannot be directly attached by the electron blocking plate 400 is B, the distance between the carbon fiber electrode 20 and the top surface of the dust collecting device 420 is C, and the distance between the carbon fiber electrode 20 and the electron blocking plate 400 is D. In addition, in FIG. 22, E represents paths in which electrons generated from the carbon fiber electrode 320 move to the dust collecting device 420.

Referring to FIG. 22, some of electrons generated in the carbon fiber electrodes 20 may be blocked by the electron blocking plates 400 and may not be directly introduced into the dust collecting device 420. Some of electrons that are not blocked by the electron blocking plates 400 may be directly introduced into the dust collecting device 420. At this time, in order to make the length B of the portion of the dust collecting device 420 blocked by the electron blocking plates 400 equal to or greater than ½ of the length A of the dust collecting device 420 (that is, B≥½ A), the distance D between the carbon fiber electrodes 20 and the electron blocking plates 400 needs to be smaller than ½ of the distance C between the carbon fiber electrode 20 and the top surface of the dust collecting device 420 (that is, D<½ C).

As an example, the carbon fiber electrode 20 may be disposed in the same direction as the flow direction F of the air introduced into the dust collecting device 420 as illustrated in FIG. 23. Even in this case, the electron blocking plates 400 may be formed to prevent electrons generated from the carbon fiber electrodes 20 from directly attaching to dust collecting device 420 in a region of ½ or more of the length of the dust collecting device 420 so that degradation of the dust collecting capability of the dust collecting device 420 caused by the electrons directly attached to the dust collecting device 420 is prevented or minimized.

In FIG. 23, the length of the dust collecting device 420 is A, the length of the portion of the dust collecting device 420 where electrons cannot be directly attached by the electron blocking plate 400 is B, the distance between the carbon fiber electrode 20 and the top surface of the dust collecting device 420 is C, and the distance between the carbon fiber electrode 20 and the electron blocking plate 400 is D. In addition, in FIG. 23, E represents paths in which electrons generated from the carbon fiber electrode 20 move to the dust collecting device 420.

Referring to FIG. 23, some of electrons generated in the carbon fiber electrodes 20 may be blocked by the electron blocking plates 400 and may not be directly attached to the dust collecting device 420. Some of electrons that are not blocked by the electron blocking plates 400 may be directly introduced into the dust collecting device 420. At this time, in order to make the length B of the portion of the dust collecting device 420 blocked by the electron blocking plates 400 equal to or greater than ½ of the length A of the dust collecting device 420 (that is, B≥½ A), the distance D between the carbon fiber electrodes 20 and the electron blocking plate 400 needs to be smaller than ½ of the distance C between the carbon fiber electrode 20 and the top surface of the dust collecting device 420 (that is, D<½ C).

The charging device 1, the plurality of electron blocking plates 400, the dust collecting device 420, and the air moving device 130 as described above may constitute an electrostatic dust collecting device using carbon fibers according to an embodiment of the present disclosure.

The charging device 1 having the plurality of electron blocking plates 400 as described above may be disposed at the inlet 111 of the electrical appliance 100'. For example, as illustrated in FIG. 24, the charging device 1 may be disposed in the indoor part 200' of the air conditioner.

Figure 24:
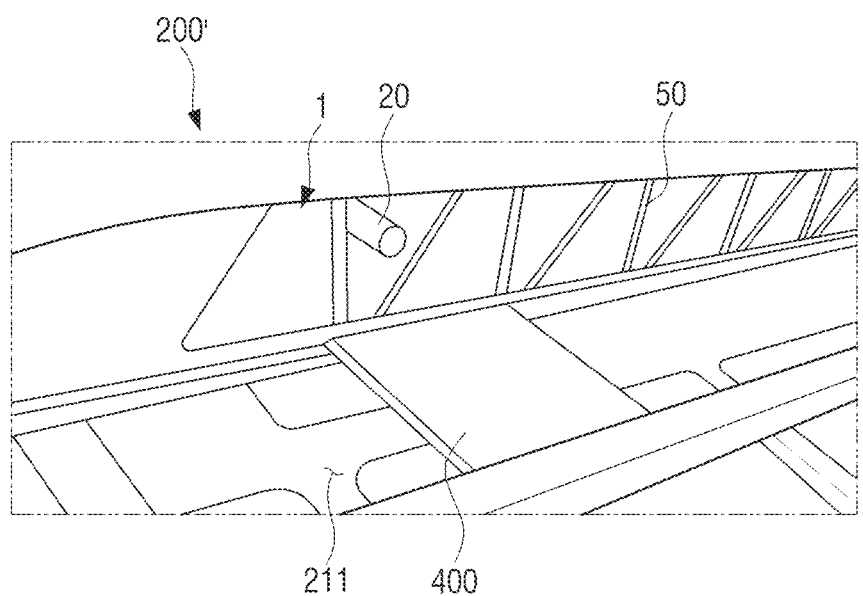
FIG. 24 is a partial perspective view illustrating a state in which a charging device having a plurality of electron blocking plates of an electrostatic dust collecting device using carbon fibers according to an embodiment of the present disclosure is disposed in an indoor part of an air conditioner.

FIG. 24 is a partial perspective view illustrating a state in which a charging device having a plurality of electron blocking plates of an electrostatic dust collecting device using carbon fibers according to an embodiment of the present disclosure is disposed in an indoor part of an air conditioner.

Referring to FIG. 24, the charging device 1 is disposed at one side of the inlet 211 so as not to interfere with the inlet 211. The carbon fiber electrodes 20 are provided inside the charging device 1. The protection grille 50 is provided in the front surface of the charging device 1. Therefore, the protection grille 50 is positioned in front of the carbon fiber electrodes 20.

The electron blocking plate 400 is formed to protrude from the front surface of the charging device 1, that is, the front surface of the protection grille 50. Therefore, the electron blocking plate 400 protrudes above the inlet 211. A dust collecting device (not illustrated) is provided below the electron blocking plate 400. Therefore, the electrons generated from the carbon fiber electrode 20 do not flow into the dust collecting device directly below the carbon fiber electrode 20, but collide with the electron blocking plate 400 to be dispersed above the inlet 211. The dispersed electrons are combined with contaminants contained in the air flow introduced into the inlet 211 to ionize the contaminants. The contaminants combined with the electrons become negative ions and are attached to the dust collecting plates 421 (see FIG. 17) of the dust collecting device 420. In detail, the contaminants that become negative ions are attached to the surface of the grounded dust collecting plate 421-1 and removed from the introduced air.

When the electron blocking plates 400 are disposed under the carbon fiber electrodes 20 as described above, the amount of electrons directly flowing into the dust collecting device 420 among the electrons generated from the carbon fiber electrodes 20 may be reduced. This will be described with reference to FIG. 25.

Figure 25:
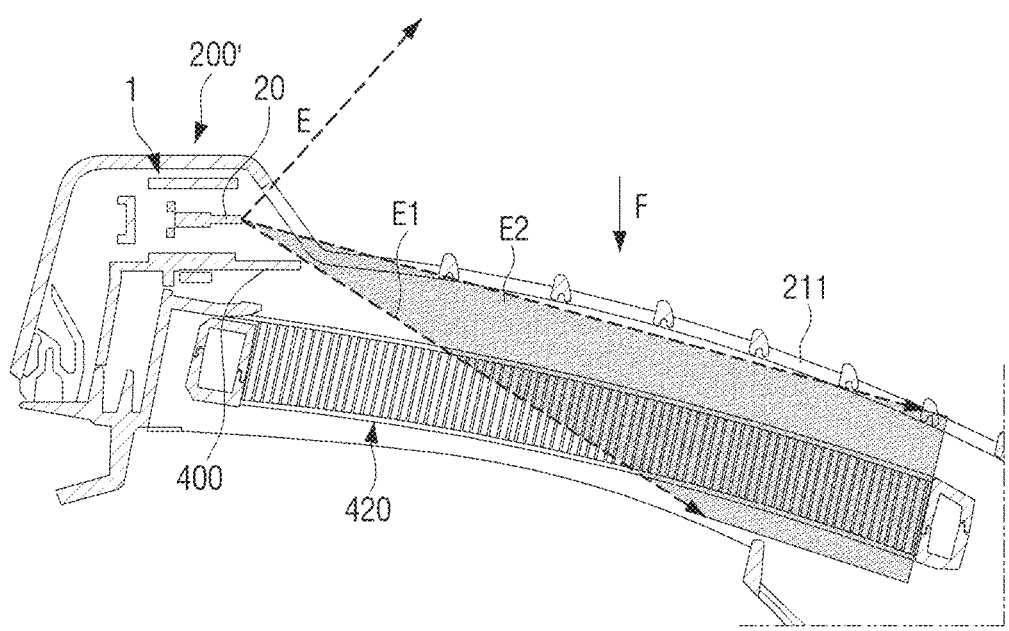
FIG. 25 is a view illustrating a region where electrons generated in a carbon fiber electrode move directly to a dust collecting device when a charging device has an electron blocking plate.

FIG. 25 is a view illustrating a region where electrons generated in a carbon fiber electrode move directly to a dust collecting device when a charging device has an electron blocking plate.

Referring to FIG. 25, electrons generated from the carbon fiber electrode 20 are spread at an angle. At this time, electrons moving downward of the carbon fiber electrode 20 do not directly enter the dust collecting device 420 because they collide with the electron blocking plate 400. However, electrons above the straight line E1 connecting the tip of the carbon fiber electrode 20 and the tip of the electron blocking plate 400 may directly flow into the dust collecting device 420. However, because it takes time for the electrons above the straight line E1 to move from the tip of the carbon fiber electrode 20 to the dust collecting device 420, the electrons are mixed with the air flow F flowing into the inlet 211. In addition, the electrons dispersed by colliding with the electron blocking plates 400 are also mixed with the air flow F flowing into the inlet 211.

When the electrons are mixed with the air flow F, the electrons combine with contaminants such as dust contained in the air flow to ionize the contaminants. For example, when a negative voltage is applied to the carbon fiber electrodes 20, electrons are generated from the carbon fiber electrodes 20, and the electrons combine with the contaminants to make the contaminants negative ions. The contaminants that become negative ions do not pass through the dust collecting device 420 and are attached to the dust collecting plates 421, thereby being removed from the air flow F.

When the electron blocking plate 400 is disposed under the carbon fiber electrode 20 as described above, some of the electrons generated from the carbon fiber electrode 20 are blocked from being directly introduced into the dust collecting device 420 and being attached to the dust collecting device 420 and are combined with contaminants, so that the dust collecting capability of the dust collecting device 420 may be increased.

However, when the electron blocking plate 400 is not disposed under the carbon fiber electrode 20, many of the electrons generated from the carbon fiber electrode 20 are directly introduced into the dust collecting device 420.

Figure 26:
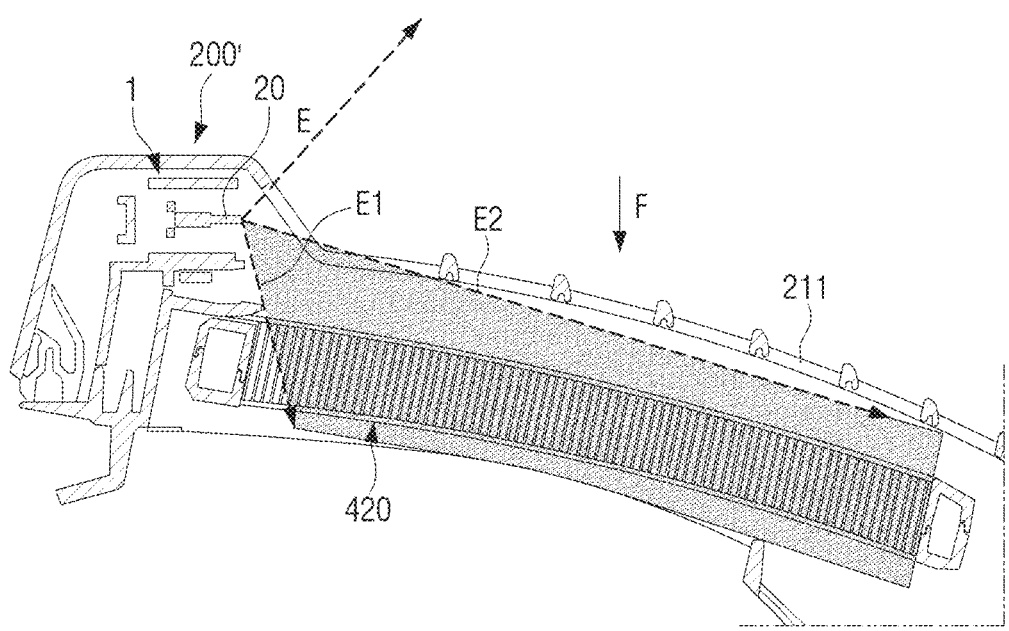
FIG. 26 is a view illustrating a region where electrons generated in a carbon fiber electrode move directly to a dust collecting device when a charging device does not include an electron blocking plate.

FIG. 26 is a view illustrating a region where electrons generated in a carbon fiber electrode move directly to a dust collecting device when a charging device does not include an electron blocking plate.

Referring to FIG. 26, electrons generated from the carbon fiber electrode 20 are spread at an angle. At this time, electrons moving downward of the carbon fiber electrode 20 (electrons above the straight line E1) may directly flow into the dust collecting device 420 because there is not the electron blocking plate 400 under the carbon fiber electrode 20. The electrons introduced into the dust collecting device 420 are attached to the surface of the dust collecting plate 421 to cause the dust collecting plate 421 to have a negative (−) potential.

Electrons generated from the carbon fiber electrodes 20 and moved in the direction of the straight line E2 are mixed with the air flow F flowing into the inlet 211. When the electrons are mixed with the air flow F, the electrons combine with contaminants such as dust contained in the air flow F to ionize the contaminants. For example, when a negative voltage is applied to the carbon fiber electrode 20, electrons are generated from the carbon fiber electrode 20, and the electrons combine with the contaminants to make the contaminants negative ions. Thus, the contaminants that become negative ions are introduced into the dust collecting device 420. However, because the dust collecting plate 421 of the dust collecting device 420 has a negative potential by the electrons directly introduced from the carbon fiber electrode 20, the ionized contaminants are not attached to the dust collecting plate 421 and pass through the dust collecting device 420. Therefore, the dust collecting capability of the dust collecting device 420 may be lowered.

A clean area of the electrostatic dust collecting device having the above-described electron blocking plates 400 and the electrostatic dust collecting device not having the electron blocking plates 400 will be described with reference to FIG. 27.

Figure 27:
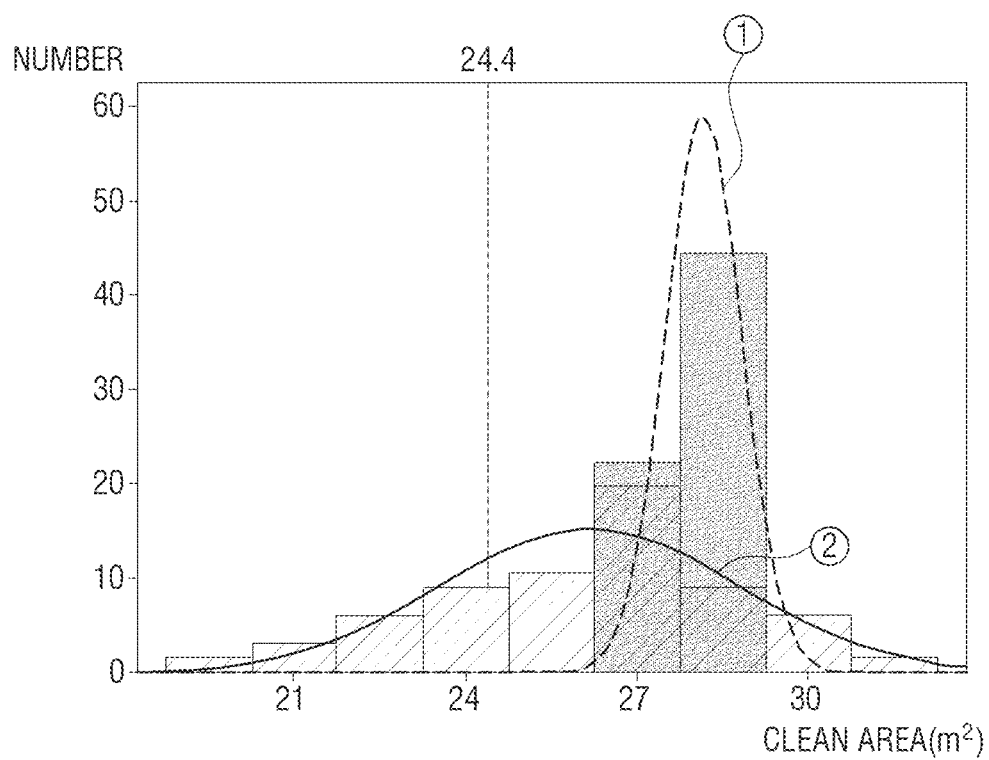
FIG. 27 is a histogram and a normal distribution graph comparing of clear areas of a case where an electrostatic dust collecting device using carbon fibers according to an embodiment of the present disclosure is provided with electron blocking plates and a case where the electron blocking plates are not provided.

FIG. 27 is a histogram and a normal distribution graph which compare clear areas when an electrostatic dust collecting device using carbon fibers according to an embodiment of the present disclosure is provided with and without electron blocking plates. In FIG. 27, the horizontal axis represents clean area m2, and the vertical axis represents number.

In FIG. 27, the clean area of the electrostatic dust collecting device with the electron blocking plates 400 is shown by the normal distribution curve ①, and the clean area of the electrostatic dust collecting device without the electron blocking plates is shown by the normal distribution curve ②. The black bars below the normal distribution curve are histograms showing the clean area of the electrostatic dust collecting device with the electron blocking plates 400, and the hatched bars below the normal distribution curve ② are histograms showing the clean area of the electrostatic dust collecting device without the electron blocking plates.

Referring to FIG. 27, the distribution of the clean area of the electrostatic dust collecting device with the electron blocking plates 400 is 0.68, and the distribution of the clean area of the electrostatic dust collecting device without the electron blocking plates is 2.62. Therefore, it may be seen that the distribution of the clean area of the electrostatic dust collecting device with the electron blocking plates is improved. Further, the center value of the clean area of the electrostatic dust collecting device with the electron blocking plates 400 is 28.1 m2, and the center value of the clean area of the electrostatic dust collecting device without the electron blocking plates is 26.1 m2; therefore, it may be seen that the clean area of the electrostatic dust collecting device with the electron blocking plates 400 is increased. In other words, it may be seen that the clean area of the electrostatic dust collecting device with the electron blocking plates 400 is increased by about 8% compared to the clean area of the electrostatic dust collecting device without the electron blocking plates.

Hereinafter, a case in which the electrostatic dust collecting device using carbon fibers according to an embodiment of the present disclosure as described above is applied to an indoor part of an air conditioner will be described with reference to FIG. 28.

Figure 28:
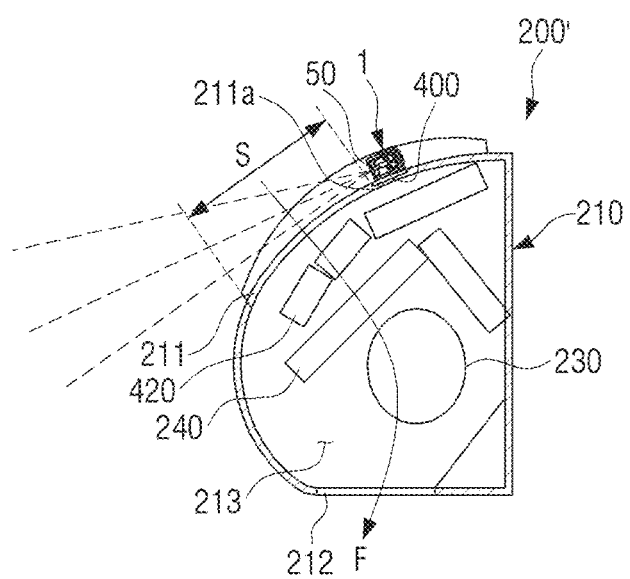
FIG. 28 is a cross-sectional view illustrating an indoor part of an air conditioner including an electrostatic dust collecting device using carbon fibers according to an embodiment of the present disclosure.

FIG. 28 is a cross-sectional view illustrating an indoor part of an air conditioner including an electrostatic dust collecting device using carbon fibers according to an embodiment of the present disclosure.

Referring to FIG. 28, an indoor part 200' of an air conditioner having the electrostatic dust collecting device using carbon fibers according to an embodiment of the present disclosure may include a case 210, a charging device 1, a plurality of electron blocking plates 400, a dust collecting device 420, a heat exchanger 240, and a blowing fan 230.

The case 210 forms the appearance of the indoor part 200' of the air conditioner. The case 210 includes an inlet 211 through which outside air is introduced and an outlet 212 through which the air, which exchanged heat with the heat exchanger 240, is exhausted. The case 210 is provided with an air passage 213 that communicate the inlet 211 and the outlet 212 with each other and through which the sucked outside air passes.

The charging device 1 is disposed on the outer surface of the case 210 so as to be adjacent to the inlet 211. The charging device 1 is configured to charge contaminants such as dust contained in the air flowing into the inlet 211 by using carbon fibers. The charging device 1 may be disposed on the outer surface of the case 210 at a position where the charging device 1 does not interfere with the projection area S of the inlet 211, that is, at the edge of the inlet 211. For example, as illustrated in FIG. 28, the charging device 1 may be disposed so that the protection grille 50 of the charging device 1 does not exceed the one end 211a of the inlet 211 of the case 210. In other words, the front surface of the charging device 1 may be coincided with one end 211a of the inlet 211 of the case 210 or may be spaced apart from the one end 211a of the inlet 211 by a certain distance.

When the charging device 1 is disposed outside the inlet 211 so that the charging device 1 does not block the inlet 211 as described above, the amount of air sucked into the inlet 211 is not reduced. Therefore, the cooling and heating efficiency of the indoor part 200' may be prevented from being reduced by the charging device 1 according to an embodiment of the present disclosure.

The charging device 1 may include a printed circuit board 30 on which the plurality of carbon fiber electrodes 20 are disposed, a housing 10 in which the plurality of carbon fiber electrodes 20 and the printed circuit board 30 are accommodated, a protection grille 50 that is provided in the opening 11 of the housing 10 and prevents the user from contacting the tips of the plurality of carbon fiber electrodes 20, and a ground electrode 40 provided in the housing 10. Such a charging device 1 is the same as the charging device 1 described above; therefore, detailed description thereof is omitted.

The plurality of electron blocking plates 400 are disposed between the charging device 1 and the dust collecting device 420. The plurality of electron blocking plates 400 are disposed to correspond one-to-one with the plurality of carbon fiber electrodes 20 of the charging device 1. The plurality of electron blocking plates 400 protrude a predetermined length from the front surface of the charging device 1 and are positioned above the inlet 211 (see FIG. 24). In addition, the plurality of electron blocking plates 400 are provided to protrude a predetermined length from one end 211a of the inlet 211 of the case 210. The plurality of electron blocking plates 400 have been described above; therefore, detailed description thereof is omitted.

The dust collecting device 420 is provided in the air passage 213 inside the case 210 and is configured to collect contaminants charged by the charging device 1 from the air sucked by the blowing fan 230. The dust collecting device 420 may include, for example, a plurality of dust collecting plates spaced apart from each other by a predetermined distance and a dust collecting voltage applier configured to apply a high voltage to the plurality of dust collecting plates. When a high voltage is applied to the plurality of dust collecting plates by the dust collecting voltage applier, contaminants ionized in combination with electrons generated by the charging device 1 may be collected in the plurality of dust collecting plates. The dust collecting device 420 is the same as the dust collecting device 420 described above; therefore, a detailed description thereof is omitted.

The heat exchanger 240 adjusts the temperature of the air by performing heat exchange with the air sucked by the blowing fan 230. For example, when the indoor part 200' of the air conditioner cools the room, the heat exchanger 240 cools the air sucked by the blowing fan 230 to lower the temperature of the air. In addition, when the indoor part 200' of the air conditioner heats the room, the heat exchanger 240 heats the air sucked by the blowing fan 230 to increase the temperature of the air. The heat exchanger 240 is the same as or similar to the heat exchanger used in the indoor part of the conventional air conditioner; therefore, a detailed description thereof is omitted.

The blowing fan 230 is disposed inside the case 210, and is configured so that outside air is sucked through the inlet 211, passes through the heat exchanger 240, and then is exhausted to the outside of the case 210 through the outlet 212. In other words, when the blowing fan 230 is operated, air containing contaminants is introduced into the inlet 211 of the case 210, and the introduced air passes through the dust collecting device 420 and the heat exchanger 240 along the air passage 213, and then exhausted through the outlet 212. Because the blowing fan 230 generates a suction force capable of sucking outside air, the blowing fan 230 may function as an air moving device of the electrostatic dust collecting device according to an embodiment of the present disclosure.

An operation of the indoor part 200' of the air conditioner having the above-described structure will be described with reference to FIG. 28.

When the indoor part 200' is operated, a high voltage is applied from the high voltage applying part 60 (see FIG. 16) to the charging device 1 provided on the outer surface of the case 210 adjacent to the inlet 211. When a high voltage is applied to the charging device 1, electrons are emitted from the plurality of carbon fiber electrodes 20 of the charging device 1. Electrons emitted from the charging device 1 combine with contaminants in the air flow flowing into the inlet 211, thereby making the contaminants negative ions (or anions). At this time, the plurality of electron blocking plates 400 block some of the electrons emitted from the charging device 1 from directly flowing into the dust collecting device 420. In other words, some of the electrons emitted from the charging device 1 collide with the plurality of electron blocking plates 400, and then are dispersed above the inlet 211, thereby charging the contaminants contained in the air flow flowing into the inlet 211.

In addition, when the indoor part 200' is operated, the blowing fan 230 is operated so that the outside air F is introduced into the case 210 through the inlet 211. At this time, the contaminants contained in the outside air flow F introduced into the inlet 211 are charged by the charging device 1.

While the introduced outside air passes through the dust collecting device 420, the charged contaminants are collected by the dust collecting device 420. At this time, because the plurality of electron blocking plates 400 prevent some of the electrons generated from the charging device 1 from being attached to the dust collecting device 420 without combining with the contaminants, the dust collecting device 420 may collect the charged contaminants. The air passing through the dust collecting device 420 moves to the heat exchanger 240.

The air cleaned by the dust collecting device 420 exchanges heat with the refrigerant of the heat exchanger 240 while passing through the heat exchanger 240, so that the temperature of the air is adjusted.

The temperature-adjusted air passes through the blowing fan 230 and is exhausted to the outside of the indoor part 200' through the outlet 212 of the case 210.

As described above, the indoor part 200' of the air conditioner equipped with the electrostatic dust collecting device using carbon fibers according to an embodiment of the present disclosure may remove contaminants from the sucked air and adjust the temperature of the air.

In addition, the electrical appliance having an electrostatic dust collecting device using carbon fibers according to an embodiment of the present disclosure includes a ground electrode; therefore, a plurality of carbon fiber electrodes may always stably emit electrons.

Further, because the charging device according to an embodiment of the present disclosure is provided with a protection grille in front of the plurality of carbon fiber electrodes, it may prevent the user's hand or finger from contacting the plurality of carbon fiber electrodes. Therefore, according to the present disclosure, when the user cleans the indoor part of the air conditioner, the user's hand or finger does not come into contact with the plurality of carbon fiber electrodes to be subjected to electric shock.

In addition, in the electrostatic dust collecting device using carbon fibers according to an embodiment of the present disclosure, the plurality of electron blocking plates prevent electrons generated from the carbon fiber electrodes from adhering to the dust collecting device in a state in which the electrons are not combined with contaminants, so that the dust collecting device may maintain the dust collecting capability.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. An electrical appliance comprising:
a main body including an inlet and an air passage;
an air moving device disposed inside the main body so that air containing contaminants introduced through the inlet in the main body is sucked through the air moving device along the air passage, and the air is exhausted to an outside of the main body;
a charging device disposed on an outer surface of the main body and spaced apart from the inlet so that the charging device is positioned outside the air passage, the charging device configured to charge the contaminants in the air sucked through the inlet; and
a dust collecting device disposed in the air passage, and configured to collect the contaminants charged by the charging device on a surface of the dust collecting device,
wherein the charging device comprises:
a housing comprising an opening formed on a front surface of the housing and a rear opening formed on a rear surface of the housing;
a printed circuit board accommodated in the housing;
a plurality of carbon fiber electrodes disposed on the printed circuit board and inside the housing, and facing toward the opening formed on the front surface of the housing, and configured to generate electrons to charge the contaminants in the air sucked through the opening formed on the front surface of the housing; and
a ground electrode disposed adjacent to the rear opening.

2. The electrical appliance of claim 1, further comprising:
a plurality of electron blocking plates disposed between the charging device and the dust collecting device and configured to block a portion of the electrons emitted from the plurality of carbon fiber electrodes of the charging device from flowing directly into the dust collecting device from the plurality of carbon fiber electrodes,
wherein the plurality of electron blocking plates are disposed to respectively correspond with the plurality of carbon fiber electrodes.

3. The electrical appliance of claim 2, wherein
the charging device is fixed to a charging device holder provided in the main body, and
the plurality of electron blocking plates are provided at regular intervals in the charging device holder.

4. The electrical appliance of claim 1,
wherein the opening formed on the front surface of the housing is spaced apart by a predetermined distance from tips of the plurality of carbon fiber electrodes and through which the plurality of carbon fiber electrodes are exposed.

5. The electrical appliance of claim 1, wherein
the ground electrode is disposed on an external surface of the housing at the rear of the plurality of carbon fiber electrodes.

6. The electrical appliance of claim 1, wherein
the ground electrode is disposed between the plurality of carbon fiber electrodes and the rear opening.

7. The electrical appliance of claim 2, wherein
the plurality of electron blocking plates are provided on an external surface of the housing.

8. The electrical appliance of claim 1, further comprising
a protection grille disposed on the opening formed on the front surface of the housing to cover the plurality of carbon fiber electrodes.

9. The electrical appliance of claim 8, wherein
the protection grille comprises holes arranged in a pattern being at least one of a triangle pattern, a square pattern, a pentagonal pattern, a hexagonal pattern, a rhombus pattern, a circular pattern, and an oval pattern.

10. The electrical appliance of claim 9, wherein
a diameter of an inscribed circle of the pattern of the holes of the protection grille does not exceed 6 mm.

11. The electrical appliance of claim 5, wherein
the housing further comprises an electrode fixing portion provided on the rear surface of the housing and comprising a plurality of fixing pins,
wherein the ground electrode comprises a plurality of through holes into which the plurality of fixing pins are inserted respectively.

12. The electrical appliance of claim 1, wherein
each of the plurality of carbon fiber electrodes comprises:
an electrode bar fixed to the printed circuit board; and
a plurality of carbon fibers disposed on the electrode bar.

13. The electrical appliance of claim 12, wherein
the plurality of carbon fiber electrodes are disposed in parallel to the printed circuit board, and
the ground electrode is disposed on the printed circuit board.

14. The electrical appliance of claim 13, wherein
the printed circuit board comprises a power supply line for applying a high voltage to the plurality of carbon fiber electrodes and a ground line for connecting the ground electrode and an external ground.

15. The electrical appliance of claim 1, wherein
the plurality of carbon fiber electrodes are arranged in a straight line on the printed circuit board.

16. The electrical appliance of claim 1, wherein
the charging device is disposed on the outer surface of the main body at a position where the charging device does not overlap the inlet.

17. The electrical appliance of claim 1, wherein
the electrical appliance comprises at least one of an air conditioner, an air purifier, a dehumidifier, a humidifier, a clothes manager, a refrigerator, and a dryer.

18. An electrical appliance comprising:
a main body including an inlet, an outlet, and an air passage connecting the inlet to the outlet;
an air moving device disposed inside the main body so that air containing contaminants introduced through the inlet in the main body is sucked through the air moving device and passes to the air passage, and the air is exhausted to an outside of the main body through the outlet;
a charging device disposed on an outer surface of the main body at an edge of the inlet, the charging device configured to charge the contaminants in the air sucked through the inlet;
a dust collecting device disposed in the air passage, and configured to collect the contaminants charged by the charging device; and
a plurality of electron blocking plates disposed between the charging device and the dust collecting device, the plurality of electron blocking plates configured to block a portion of the electrons emitted from the charging device from flowing directly into the dust collecting device from the charging device,
wherein the charging device comprises:
a housing;
a printed circuit board provided in the housing;
a plurality of carbon fiber electrodes respectively corresponding to the plurality of electron blocking plates, disposed on the printed circuit board, formed to protrude toward the inlet in the main body, and configured to generate electrons to charge the contaminants in the air sucked through the inlet; and
a ground electrode disposed on an opposite side of the printed circuit board relative to the plurality of carbon fiber electrodes.

19. The electrical appliance of claim 18, wherein
the housing comprises:
an opening spaced apart by a predetermined distance from tips of the plurality of carbon fiber electrodes and through which the plurality of carbon fiber electrodes are exposed, and
a rear opening provided on an opposite side of the printed circuit board relative to the opening.

20. The electrical appliance of claim 19, further comprising
a protection grille provided on the opening of the housing to cover the plurality of carbon fiber electrodes.

* * * * *